(12) United States Patent
Ni et al.

(10) Patent No.: US 7,880,026 B2
(45) Date of Patent: Feb. 1, 2011

(54) MOF SYNTHESIS METHOD

(75) Inventors: Zheng Ni, Urbana, IL (US); Richard I. Masel, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 950 days.

(21) Appl. No.: 11/785,102

(22) Filed: Apr. 13, 2007

(65) Prior Publication Data

US 2009/0131643 A1      May 21, 2009

(51) Int. Cl.
*C07F 15/00* (2006.01)
*C07F 3/00* (2006.01)
*C07F 1/00* (2006.01)

(52) U.S. Cl. .................... 556/110; 556/118; 556/138; 549/3; 549/206; 546/2; 534/16; 204/157.75

(58) Field of Classification Search ............ 204/157.75; 534/16; 546/2; 556/110, 118, 138; 549/3, 549/206; 540/140

See application file for complete search history.

(56) References Cited

U.S. PATENT DOCUMENTS

| | | | |
|---|---|---|---|
| 3,168,823 A | 2/1965 | Reinecke et al. | |
| 3,345,858 A | 10/1967 | Fenske | |
| 3,357,232 A | 12/1967 | Lauer | |
| 3,568,411 A | 3/1971 | Dravnieks et al. | |
| 3,585,863 A | 6/1971 | Hrdina | |
| 3,675,466 A | 7/1972 | Linenberg | |
| 3,733,908 A | 5/1973 | Linenberg | |
| 3,769,837 A | 11/1973 | Kraus | |
| 3,797,318 A | 3/1974 | Palm | |
| 3,807,217 A | 4/1974 | Wilkins et al. | |
| 3,897,679 A | 8/1975 | Guild | |
| 3,923,461 A | 12/1975 | Barden | |
| 3,925,022 A | 12/1975 | Showalter et al. | |
| 3,950,980 A | 4/1976 | Braun et al. | |
| 3,985,017 A | 10/1976 | Goldsmith | |
| 4,040,085 A | 8/1977 | Jouanny | |

(Continued)

OTHER PUBLICATIONS

Panda, A. B. et al., Microwave Synthesis of Highly Aligned Ultra Narrow Semiconductor Rods and Wires, J. Am. Chem. Soc., 128:2790-2791 (2006).

(Continued)

*Primary Examiner*—Porfirio Nazario Gonzalez
(74) *Attorney, Agent, or Firm*—Townsend and Townsend and Crew LLP

(57) ABSTRACT

A rapid, simple and versatile metal organic framework molecule (MOF) synthesis method particularly adapted to make non-linear MOFs includes heating MOF precursors, such as a metal or metal oxide and an organic ligand, in a microwave oven for a period sufficient to achieve crystallization. Microwave-assisted MOF synthesis yields high quality MOF crystals in a reaction time ranging from about 5 seconds to about 2.5 minutes, compared to hours and days required in conventional solvothermal and hydrothermal methods. In addition, microwave assisted methods provide MOF materials with uniform crystal size and well-defined shape. Further, microwave synthesis of MOFs allows the size and shape of MOF crystals to be tailored for use in a wide range applications by manipulating reaction conditions. Secondary growth processes may also be employed to grow larger crystals using seeds obtained from microwave-assisted synthesis methods.

25 Claims, 9 Drawing Sheets

U.S. PATENT DOCUMENTS

| | | |
|---|---|---|
| 4,040,805 A | 8/1977 | Nelms et al. |
| 4,084,440 A | 4/1978 | Carpenter et al. |
| 4,128,008 A | 12/1978 | Linenberg |
| 4,129,424 A | 12/1978 | Armond |
| 4,180,389 A | 12/1979 | Paul |
| 4,235,097 A | 11/1980 | Kring et al. |
| 4,293,316 A | 10/1981 | Block |
| 4,301,114 A | 11/1981 | Rounbehler et al. |
| 4,399,688 A | 8/1983 | Dennis |
| 4,451,816 A | 5/1984 | Ball |
| 4,541,268 A | 9/1985 | Odernheimer |
| 4,599,095 A | 7/1986 | Barnes et al. |
| 4,698,071 A | 10/1987 | Elias |
| 4,701,306 A | 10/1987 | Lawrence et al. |
| 4,713,091 A | 12/1987 | Govind |
| 4,759,210 A | 7/1988 | Wohltjen |
| 4,778,666 A | 10/1988 | Chu et al. |
| 4,805,441 A | 2/1989 | Sides et al. |
| 4,819,477 A | 4/1989 | Fisher et al. |
| 4,915,051 A | 4/1990 | Martinek |
| 4,915,843 A | 4/1990 | Taniguchi et al. |
| 4,977,095 A | 12/1990 | Zaromb |
| 4,997,676 A | 3/1991 | Lefebvre |
| 5,014,541 A | 5/1991 | Sides et al. |
| 5,083,019 A | 1/1992 | Spangler |
| 5,092,155 A | 3/1992 | Rounbehler et al. |
| 5,092,217 A | 3/1992 | Achter et al. |
| 5,092,218 A | 3/1992 | Fine et al. |
| 5,110,551 A | 5/1992 | Michal |
| 5,123,276 A | 6/1992 | Hartman et al. |
| 5,142,143 A | 8/1992 | Fite et al. |
| 5,162,652 A | 11/1992 | Cohen et al. |
| 5,173,264 A | 12/1992 | Zaromb et al. |
| 5,224,972 A | 7/1993 | Frye et al. |
| 5,288,310 A | 2/1994 | Peters et al. |
| 5,294,418 A | 3/1994 | Ramprasad et al. |
| 5,328,851 A | 7/1994 | Zaromb |
| 5,395,589 A | 3/1995 | Nacson |
| 5,465,607 A | 11/1995 | Corrigan et al. |
| 5,468,851 A | 11/1995 | Seeman et al. |
| 5,481,110 A | 1/1996 | Krishnaswamy et al. |
| 5,482,677 A | 1/1996 | Yao et al. |
| 5,522,918 A | 6/1996 | Shiramizu |
| 5,532,129 A | 7/1996 | Hellar |
| 5,551,278 A | 9/1996 | Rounbehler et al. |
| 5,585,575 A | 12/1996 | Corrigan et al. |
| 5,589,396 A | 12/1996 | Frye et al. |
| 5,648,508 A | 7/1997 | Yaghi |
| 5,720,798 A | 2/1998 | Nickerson et al. |
| 5,753,832 A | 5/1998 | Bromberg et al. |
| 5,763,360 A | 6/1998 | Gundel et al. |
| 5,795,368 A | 8/1998 | Wright et al. |
| 5,830,427 A | 11/1998 | Bedard et al. |
| 5,854,431 A | 12/1998 | Linker et al. |
| 5,876,830 A | 3/1999 | Michl et al. |
| 5,970,804 A | 10/1999 | Robbat, Jr. |
| 6,085,601 A | 7/2000 | Linker et al. |
| 6,110,247 A | 8/2000 | Birmingham et al. |
| 6,165,254 A | 12/2000 | Kawakami et al. |
| 6,171,378 B1 | 1/2001 | Manginell et al. |
| 6,187,412 B1 | 2/2001 | Armacost et al. |
| 6,223,584 B1 | 5/2001 | Mustacich et al. |
| 6,345,545 B1 | 2/2002 | Linker et al. |
| 6,355,793 B1 | 3/2002 | Lin |
| 6,372,932 B1 | 4/2002 | Kepert et al. |
| 6,384,253 B1 | 5/2002 | Khan |
| 6,455,003 B1 | 9/2002 | Anvia et al. |
| 6,491,740 B1 | 12/2002 | Wang et al. |
| 6,517,610 B1 | 2/2003 | de la Houssaye |
| 6,523,393 B1 | 2/2003 | Linker et al. |
| 6,527,835 B1 | 3/2003 | Manginell et al. |
| 6,604,406 B1 | 8/2003 | Linker et al. |
| 6,607,700 B1 | 8/2003 | Apte et al. |
| 6,610,125 B2 | 8/2003 | Tripp et al. |
| 6,656,738 B1 | 12/2003 | Vogel et al. |
| 6,685,841 B2 | 2/2004 | Lopez et al. |
| 6,719,828 B1 | 4/2004 | Lovell et al. |
| 6,749,826 B2 | 6/2004 | Tillotson et al. |
| 6,772,513 B1 | 8/2004 | Frye-Mason et al. |
| 6,773,674 B2 | 8/2004 | Bannister et al. |
| 6,814,781 B2 | 11/2004 | Tonkovich et al. |
| 6,840,120 B2 | 1/2005 | Sakairi et al. |
| 6,848,325 B2 | 2/2005 | Parmeter et al. |
| 6,875,257 B2 | 4/2005 | Rodgers |
| 6,893,564 B2 | 5/2005 | Mueller et al. |
| 6,902,701 B1 | 6/2005 | Hughes et al. |
| 6,910,394 B2 | 6/2005 | Kriel |
| 6,913,697 B2 | 7/2005 | Lopez et al. |
| 6,914,220 B2 | 7/2005 | Tian et al. |
| 6,929,679 B2 | 8/2005 | Muller et al. |
| 6,930,193 B2 | 8/2005 | Yaghi et al. |
| RE38,797 E | 9/2005 | Linker et al. |
| 6,965,026 B2 | 11/2005 | Zaworotko et al. |
| 6,967,103 B2 | 11/2005 | Schwartz et al. |
| 6,967,193 B1 | 11/2005 | Dang et al. |
| 6,978,657 B1 | 12/2005 | Baumann et al. |
| 6,984,524 B2 | 1/2006 | Nguyen et al. |
| 6,989,044 B2 | 1/2006 | Zhang et al. |
| 7,000,452 B2 | 2/2006 | Bonne et al. |
| 7,052,677 B1 | 5/2006 | Raptis et al. |
| 2003/0004364 A1 | 1/2003 | Yaghi et al. |
| 2003/0078311 A1 | 4/2003 | Muller et al. |
| 2003/0148165 A1 | 8/2003 | Muller et al. |
| 2003/0222023 A1 | 12/2003 | Mueller et al. |
| 2004/0097724 A1 | 5/2004 | Muller et al. |
| 2004/0225134 A1 | 11/2004 | Yaghi et al. |
| 2004/0249189 A1 | 12/2004 | Mueller et al. |
| 2004/0265670 A1 | 12/2004 | Muller et al. |
| 2005/0004404 A1 | 1/2005 | Muller et al. |
| 2005/0101027 A1 | 5/2005 | Haas |
| 2005/0124819 A1 | 6/2005 | Yaghi et al. |
| 2005/0154222 A1 | 7/2005 | Muller et al. |
| 2005/0192175 A1 | 9/2005 | Yaghi et al. |
| 2006/0057057 A1 | 3/2006 | Muller et al. |
| 2006/0099398 A1 | 5/2006 | Hesse et al. |
| 2010/0132547 A1* | 6/2010 | Masel et al. .......... 95/90 |

OTHER PUBLICATIONS

Tompsett, G. A. et al., Microwave Synthesis of Nanoporous Materials, ChemPhysChem, 7:296-319 (2006).

Ye, Qiong et al., Ferroelectric Metal-Organic Framework with a High Dielectric Constant, J. Am. Chem. Soc. 128(20):6554-6555 (2006).

Abourahma, H. et al., Hydroxylated nanoballs: synthesis, crystal structure, solubility and crystallization on surfaces, Chem. Comm., 2380-2381 (2001).

Abrahams, B. F. et al., Assembly of porphyrin building blocks into network structures with large channels, Nature 369:727-729 (Jun. 30, 1994).

Arii, H. et al., Unique Three-dimensionally Expanded Nanoporous Structure Constructed with a Cu(I) and cis,cis-1,3,5,-Triaminocyclohexane Having a 3-fold Axial Symmetry, Chemistry Letters 32(1):106-107 (2003).

Bae, B. et al., A Touch-Mode Capacitance Microvalve Equipped with High Speed and Pressure Microsecond Switching Performance, MEMS 2006, Istanbul, Turkey, 766-769 (Jan. 22-26, 2006).

Bai, X. et al., A novel three-dimensional hybrid framework based on fishbone-like copper halide inorganic units, Inorganica Chimica Acta 358:2571-2574 (2005).

Bai, Y. et al., A three dimensional porous metal-organic framework $[Fe_4L_6 \cdot (DMF)_3 \cdot (H_2O)_{10}]$ constructed from neutral discrete $Fe_4L_6$ pyramids [$H_2L$=1,3-benzodihydroxamix acid]. Chem. Commun., 186-187 (2004).

Beinert, H. et al., Iron-Sulfur Clusters: Nature's Modular, Multipurpose Structures, Science 277:653-659 (1997).

Biemmi, E. et al., Synthesis and characterization of a new metal organic framework structure with a 2D porous system: $(H_2NEt_2)[Zn_3(BDC)_4]$ 3DEF, Solid State Sciences 8:363-370 (2006).

Biradha, K. et al., 2D and 1D Coordination Polymers with the Ability for Inclusion of Guest Molecules: Nitrobenzene, Benzene, Alkoxysilanes, Journal of Inclusion Phenomena and Macrocyclic Chemistry 49:201-208 (2001).

Bourne, S. A. et al., 1-D coordination polymers containing benzenedicarboxylate, Crystal Engineering 4:25-36 (2001).

Bourne, S. A. et al., coexisting covalent and noncovalent nets: parallel interpenetration of a puckered rectangular coordination polymer and aromatic noncovalent nets, Chem. Comm., 861-862 (2001).

Bourne, S. A. et al., Self-Assembly of Nanometer-Scale Secondary Building Units into an Undulating Two-Dimensional Network with Two Types of Hydrophobic Cavity, Angew. Chem. Int. Ed., 40(11):2111-2113 (2001).

Cai, Q.-Y. et al., Vapor recognition with an integrated array of polymer-coated flexural plate wave sensors, Sensors and Actuators B 62, 121-130 (2000).

Capparelli, M. V. et al., X-ray crystallographic structure of $Ga_8(pz)_{12}O_4Cl_4$ 2thf: a novel gallium pyrazololate complex with a $Ga_4O_4$ core, Chem. Comm. 937-938 (1997).

Carvalho, A. T. et al., Improvement on Organic Compound Adsorption and/or Detection by Using Metallic Thin Films Deposited onto Highly Rough Silicon Substrates, Sensors and Actuators B, 108:947-954 (2005).

Chae, H. K. et al., A route to high surface area, porosity and inclusion of large molecules in crystals, Nature, 427:523-527 (2004).

Chae, H. K. et al., Design of frameworks with Mixed Triangular and Octahedral Building Blocks Exemplified by the Structure of $[Zn_4 O(TCA)_2]$ Having the Pyrite Topology, Angew. Chem. Int. Ed., 42:3907-3909 (2003).

Chen, B. et al., A Microporous Metal-Organic Framework for Gas-Chromatographic Separation of Alkanes, Angew. Chem. Int. Ed. 45:1390-1393 (2006).

Chen, B. et al., High $H_2$ Adsorption in a Microporous Metal-Organic Framework with Open Metal Sites, Angew. Chem. Int. Ed. 44:4745-4749 (2005).

Chen, B. et al., Interwoven Metal-Organic Framework on a Periodic Minimal Surface with Extra-Large Pores, Science 291:1021-1023 (2001).

Chen, B. et al., Transformation of a Metal-Organic Framework from the NbO to PtS Net, Inorganic Chemistry, 44:181-183 (2005).

Chen, J. et al., A New Open Metal-Organic Framework $[(Zn_8(GeO_4)(C_8H_4O_4)_6]n$, Constructed by Heterometallic Cluster Zn8(GeO4) Secondary Building Units, Chemistry Letters 32(5):474-475 (2003).

Choi, H. J. et al., Dynamic and Redox Active Pillared Bilayer Open Framework: Single-Crystal-to-Single-Crystal Transformations upon Guest Removal, Guest Exchange, and Framework Oxidation, Journal of the American Chemical Society, 126:15844-15851 (2004).

Chui et al., A Chemically Functionalizable Nanopourous Material $[Cu_3(TMA)_2H_2O)_3]n$, Science 283:1148-1150 (1999).

Clausen, H. F. et al., Solvothermal synthesis of new metal organic framework structures in the zinc-terephthalic acid-dimethyl formamide system, Journal of Solid State Chemistry, 178:3342-3351 (2005).

Colacio, E. et al., Hydrothermal Syntheses, Crystal Structures, and Properties of Two-Dimensional Homo and Heterometallic Cyanide-Bridged Complexes: $[Cu_2(CN)_2(bpym)]$ and $[Fe((bipy)_2(CN)_4Cu_2]$ [(bpym=2,2'-Bipyrimidine, bipy=2,2'-Bipyridine), Inorganic Chemistry 42(13):4209-4214 (2003).

International Preliminary Report on Patentability, cited in related International application No. PCT/US2006/038998, May 23, 2007.

Cussen, E. J. et al., Flexible Sorption and Transformation Behavior in a Microporous Metal-Organic Framework, Journal of the American Chemical Society, 124:9574-9581 (2002).

Custelcea, R. et al., A Metal-Organic Framework Functionalized with Free Carboxylic Acid Sites and Its Selective Binding of a $Cl(H_2O)_4$—Cluster, J. Am. Chem. Soc. 127:16362-16363 (2005).

Dathe, H. et al., Metal organic frameworks based on $Cu^{2+}$ and benezene-1,3,5-tricarboxylate as host for $SO_2$ trapping agents, C.R. Chimie 8:753-763 (2005).

Davis, C. E. et al., Enhanced detection of $m$-xylene using a preconcentrator with a chemiresistor sensor, Sensors and Actuators B, 104:207-216 (2005).

Devic, T. et al., MIL-103, A 3-D Lanthanide-Based Metal Organic Framework with Large One-Dimensional Tunnels and A High Surface Area, J. Am. Chem. Soc. 127:12788-12789 (2005).

Dietzel, P. D.C. et al., Hydrogen adsorption in a nickel based coordination polymer with open metal sites in the cylindrical cavities of the desolvated framework, Chem. Commun. 959-91 (2006).

Dimitrou, K. et al., The $[Co_4O_4]^{4+}$ Cubane as Quadruply-Bridging Unit: The Mixed-Valence Cluster $[Co_8O_4(O_2CPh)_{12}(solv)_4]$ (solv=DMF, MeCN, $H_2O$), Inorganic Chemistry 34:4160-4166 (1995).

Ding, B.-B. et al., Pillared-Layer Microporous Metal-Organic Frameworks Constructed by Robust Hydrogen Bonds, Synthesis, Characterization, and Magnetic and Adsorption Properties of 2,2'-Biimidazole and Carboxylate Complexes, Inorganic Chemistry, 44(24):8836-8845 (2005).

Duan, L. et al., Hydrothermal synthesis and crystal structures of two novel rare earth coordination polymers based on pyridine-2,6-dicarboxylic acid, Journal of Molecular Structure, 689:269-274 (2004).

Dybtsev et al., A Homochiral Metal-Organic Material with Permanent Porosity, Enantioselective Sorption Properties, and Catalytic Activity, Angew. Chem. Int. Edition 45, 916-920 (2006).

Dybtsev, D. N. et al., Rigid and Flexible: A Highly Porous Metal-Organic Framework with Unusual Guest-Dependent Dynamic Behavior, Angew. Chem. Int. Ed. 43:5033-5036 (2004).

Dybtsev, D. N. et al., Three-dimensional metal-organic framework with (3,4)-connected net, synthesized from an ionic liquid medium, Chem. Commun., 1594-1595 (2004).

Eddaoudi, M. et al., Design and sythesis of metal-carboxylate frameworks with permanent microporosity, Topics in Catalysis 9:105-111 (1999).

Eddaoudi, M. et al., Modular Chemistry: Secondary Building Units as a Basis for the Design of Highly Porous and Robust Metal-Organic Carboxylate Frameworks, Acc. Chem. Res. 34:319-330 (2001).

Eddaoudi, M. et al., Systemic Design of Pore Size and Functionality in Isoreticular MOFs and Their Application in Methane Storage, Science, 295, 469-472 (2002).

Eubank, J. F. et al., Terminal co-ligand directed synthesis of a neutral, non-interpenetrated (10,3)-α metal-organic framework, Chem. Commun., 2095-2097 (2005).

Fang, Q. et al., A Metal-Organic Framework with the Zeolite MTN Topology Containing Large Cages of vol. 2.5 $nm^3$, Angew. Chem.. Int. Ed. 44:3845-3848 (2005).

Flachsbart, B. R. et al., Design and fabrication of a multilayered polymer microfluidic chip with nanofluidic interconnects via adhesive contact printing, Lab on a Chip, 6:667-674 (2006).

Fletcher, A. J. et al., Adsorption Dynamics of Gases and Vapors on the Nanoporous Metal Organic Framework Material $Ni_2$ (4,4-bipyridine)$_3(NO_3)_4$: Guest modification of Host Sorption Behavior, Journal of the American Chemical Society 123:10001-10011 (2001).

Fletcher, A. J. et al., Adsorption of Gases and Vapors on Nanoporous $Ni_2(4,4'$-Bipyridine)3(NO3)4 Metal-Organic Framework Materials Templated with Methanol And Ethanol: Structural Effects in Adsorption Kinetics, Journal of the American Chemical Society, 126:9750-9759 (2004).

Fletcher, A. J. et al., Flexibility in metal-organic framework materials: Impact on sorption properties, Journal of Solid State Chemistry, 178:2491-2510 (2005).

Fuentes-Cabrera et al., Electronic structure and properties of isoreticular metal-organic frameworks: The case of $M$-IRMOF (M=Zn, Cd, Be, Mg, and Ca), The Journal of Chemical Physics, 123:124713-1-124713-5 (2005).

Garberoglio, G. et al., Adsorption of Gases in Metal Organic Materials: Comparison of Simulations and Experiments, Journal of Physical Chemistry B, 109:13094-13103 (2005).

Ghosh, S. K. et al., Coexistence of Water Dimer And Hexamer Clusters in 3D Metal-Organic Framework Structures of Ce(III) and Pr(III) with Pyridine-2,6-dicarboxylic Acid, Inorganic Chemistry 42(25):8250-8254 (2003).

Ghosh, S. K. et al., Infinite Chains of Quasi-Planar Hexameric Water Clusters Stabilized in a Metal-Organic Framework Built from $Co_{II}$ and Pyrazine-2,3,5,6-tetracarboxylic Acid, Eur. Journal of Inorganic Chemistry, 4880-4885 (2005).

Ghosh, S. K. et al., Puckered-Boat Conformation Hexameric Water Clusters Stabilized in A 2D Metal-Organic Framework Structure Built from Cu(II) and 1,2,4,5-Benzenetetracarboxylic Acid, Inorganic Chemistry, 43:5180-5182 (2004).

Goforth, A. M. et al., Connecting small ligands to generate large tubular metal-organic architectures, Journal of Solid State Chemistry 178:2511-2518 (2005).

Gonzales, J. et al., Deuterium NMR studies of framework and guest mobility in the metal-organic framework compound MOF-5, $Zn_4O(O_2CC_6H_4CO_2)_3$, Microporous and Mesoporous Materials, 84:97-104 (2005).

Gorun, S. M. et al., Magnetostructural Correlations in Magnetically Coupled (μ-Oxo)Diiron(III) Complexes, Inorganic Chemistry, 30(7):1625-1630 (1991).

Grate, J.W. et al., Progressive Thermal Desorption of Vapor Mixtures from a Preconcentrator with a Porous Metal Foam Internal Architecture and Variable Thermal Ramp Rates, Analytical Chemistry 77(6):1867-1875 (2005).

Groves, W. A. et al., Analyzing organic vapors in exhaled breath using a surface acoustic wave sensor array with preconcentration: Selection and characterization of the preconcentrator adsorbent, Analytica Chimica Acta 371:131-143 (1998).

Groves, W. A. et al., Prototype Instrument Employing a Microsensor Array for the Analysis of Organic Vapors in Exhaled Breath, American Industrial Hygiene Association Journal 57:1103-1108 (Dec. 1996).

Grudpan, K. et al., Flow injection spectrophotometric determination of As (III) and As(V) using molybdate reagent with solid phase extraction in-valve column, Indian Journal of Chemistry, 42A:2939-2944 (Dec. 2003).

Guo, Y. et al., Synthesis and crystal structure of a novel three-dimensional supramolecular network containing one-dimensional honeycomb-like channels, Inorganica Chimica Acta, 357:269-274 (2004).

Halder, G. J. et al., In Situ Single-Crystal X-Ray Diffraction Studies of Desorption and Sorption in a Flexible Nanoporous Molecular Framework Material, Journal of the American Chemical Society, 127:7891-7900 (2005).

Hasimoto, H., On the periodic fundamental solutions of the Stokes equations and their application to viscous flow past a cubic array of spheres, J. Fluid Mech., 5:317-328 (1959).

He, J. et al., Synthesis, Structure, and Luminescent Property of a Heterometallic Metal-organic Framework Constructed from Rod-shaped Secondary Building Blocks, Inorganic Chemistry, 44(25):9279-9282 (2005).

He, J. et al., Three metal-organic frameworks prepared from mixed solvents of DMF and HAc, Microporous and Mesoporous Materials, 90:145-152 (2006).

Holt, J. K. et al., Fabrication of a Carbon Nanotube-Embedded Silicon Nitride Membrane for Studies of Nanometer-Scale Mass Transport, American Chemical Society, Nano Letters 4(11):2245-2250 (2004).

Hong, J., $[Zn_2(BTDA)(bpy)(H_2O)]$•0.5bpy: a new three-dimensional metal-organic framework cnstructured from flexible and rigid mixed ligands, Journal of Molecular Structure, 752:166-169 (2005).

Hoskins, B. F. et al., Infinite Polymeric Frameworks Consisting of Three Dimensionally Linked Rod-like Segments, Journal of the American Chemical Society 111(15):5962-5964 (1989).

Hynek, S. et al., Hydrogen storage by carbon sorption, Int. J. Hydrogen Energy, 22(6):601-610 (1997).

Ito, J. et al., Discrimination of halitosis substance using QCM sensor array and a preconcentrator, Sensors and Actuators B 99:431-436 (2004).

James, S. L. et al., Anion-templated formation of a unique inorganic 'super-adamantoid' cage $[Ag_6(triphos)_4(O_3SCF_3)_4]^{2+}$ [triphos = $(PPh_2CH_2)_3CMe$], Chemical Communication, 2323-2324 (1998).

Janiak, C., Functional Organic Analogues of Zeolites Bases on Metal-Organic Coordination Frameworks, Angew. Chem. Int. ed. Engl. 36(13/14):1431-1434 (1997).

Jones, C. W. et al., Organic-functionalized molecular sieves as shape-selective catalysts, Nature 393:52-54 (May 7, 1998).

Jotham, R. W. et al., Antiferromagnetism in Transition-metal Complexes. Part IV.[1] Low-lying Excited States of Binuclear Copper$_{(II)}$ Carboxylate Complexes, J.C.S. Dalton, 428-438 (1972).

Kato, M. et al., Copper (II) complexes with subnormal magnetic moments, Richardson Chemistry Laboratory, Tulane University, New Orleans Louisiana, 99-128 (Dec. 20, 1963).

Keller, J. B., Viscous flow through a grating or lattice of cylinders, J. Fluid Mech. 18:94-96 (1964)

Kepert, C. J. et al., A. porous chiral framework of coordinated 1,3,5-benzenetricarboxylate: quadruple interpenetration of the (10,3)-a network, Chem Communication, 31-32 (1998).

Kepert, C. J., Advanced functional properties in nanoporous coordination framework materials, Chemical Communication, 695-700 (2006).

Kim, J. et al., Assembly of Metal-Organic Frameworks from Large Organic and Inorganic Secondary Building Units: New Examples and Simplifying Principles for Complex Structures, J. Am. Chem. Soc. 123:8239-8347 (2001).

Kitaura, R. et al., Formation and Characterization of Crystalline Molecular Arrays of Gas Molecules in a 1-Dimensional Ultramicropore of a Porous Copper Coordination Polymer, Journal of Physical Chemistry B, 109:23378-23385 (2005).

Kitaura, R. et al., Rational Design and Crystal Structure Determination of a 3-D Metal-Organic Jungle-Gym-Like Open Framework, Inorganic Chemistry, 43(21):6522-6524 (2004).

Kondo, M. et al., Rational Synthesis of Stable Channel-Like Cavities with Methane Gas Adsorption Properties: $[\{Cu_2(pzdc)_2(L)\}_n]$ (pzdc=pyrazine-2,3-dicarboxylate; L=a Pillar Ligand), Angew. Chem. Int. Ed. 38(½):140-143 (1999).

Kosal, M. E. et al., A functional zeolite analogue assembled from metalloporphyrins, Nature Materials, 1:118-121 (2002).

Krawiec, P. et al., Improved Hydrogen Storage in the Metal-Organic Framework $Cu_3(BTC)_2$, Advanced Engineering Materials 8(4):293-296 (2006).

Kresge, C. T. et al., Ordered mesoporous molecular sieves synthesized by a liquid-crystal template mechanism, Nature 359:710-712 (Oct. 22, 1992).

Lebedev, O. I. et al., First Direct Imaging of Giant Pores of the Metal-Organic Framework MIL-101, Chemistry Materials, 17:6525-6527 (2005).

Lee, E. Y. et al., Multifunctionality and Crystal Dynamics of a Highly Stable, Porous Metal-Organic Framework $[Zn_4O(NTB)_2]$, Journal of the American Chemical Society, 127:6374-6381 (2005).

Lee, J. Y. et al., Achieving High Density of Adsorbed Hydrogen in Microporous Metal Organic Frameworks, Advanced Materials, 17:2703-2706 (2005).

Lee, J. Y. et al., Gas sorption properties of microporous metal organic frameworks, Journal of Solid State Chemistry, 178:2527-2532 (2005).

Lewis, P. R. et al., Recent Advancements in the Gas-Phase MicroChemLab, IEEE Sensors Journal, 6(3):784-795 (Jun. 2006).

Li, H. et al., Coordinatively unsaturated metal centers in the extended porous framework of $Zn_3(BDC)_3$•$6CH_3OH$ (BDC = 1,4-Benzenedicarboxylate), Journal of American Chemical Society 120:2186-2187 (1998).

Li, H. et al., Design and synthesis of an exceptionally stable and highly porous metal-organic framework, Nature 402:276-279 (Nov. 18, 1999).

Li, Y-G. et al., A Novel Three-Dimensional Metal-Organic Framework Constructed From Two-Dimensional Interpenetrating Layers Based on Trinuclear Cobalt Clusters: $[Co_3(btec)(C_2O_4)(H_2O)_2]n$, Eur. J. of Inorg. Chem., 2567-2571 (2003).

Liang, Y. et al., Hydrothermal synthesis and characterization of the coordination polymer $[Zn(bbdc)(H_2O)_i]_n$ (bbdc=4,4'-bibenzenedicarboxylate) possessing a 3D network structure, Inorganic Chemistry Communications 4:599-601 (2001).

Liang, Y.-C. et al., Hydrothermal syntheses, structural characterizations and magnetic properties of cobalt(II) and manganese(II) coordination polymeric complexes containing pyrazinecarboxylate ligand, Inorganica Chimica Acta, 328:152-158 (2002).

Lin et al., A Novel Optupolar Metal-Organic NLO Material Based on a Chiral 2D Coordination Network, J. Am. Chem. Soc. 121:11249-11250 (1999).

Lin, Z. et al., Microwave-assisted synthesis of anionic metal-organic frameworks under ionothermal conditions, Chem. Commun., 2021-2023 (2006).

Liu, Y.-H. et al., Hydrothermal Synthesis, Crystal Structure, and Magnetic Property of Copper(II) Coordination Networks with Chessboard Tunnels, Journal of Solid State Chemistry 158:315-319 (2001).

Livage, C. et al., A Three-Dimensional Metal-Organic Framework with an Unprecedented Octahedral Building Unit, Angew. Chem. Int. Ed. 44:6488-6491 (2005).

Long, T. M. et al., Water-Vapor Plasma-Based Surface Activation for Trichlorosilane Modification of PMMA, Langmuir, 22(9):4104-4109 (2006).

Lu, C.-J. et al., A Dual-Adsorbent Preconcentrator for a Portable Indoor-VOC Microsensor System, Analytical Chemistry 73(14):3349-3457 (Jul. 15, 2001).

Lu, C.-J. et al., First-generation hybrid MEMS gas chromatograph, Lab Chip, 5:1123-1131 (2005).

Lu, J. et al., Coordination Polymers of $Co(NCS)_2$ with Pyrazine and 4,4'-Bipyridine: Syntheses and Structures, Inorganic Chemistry 36:923-929 (1997).

Lu, J. et al., Polygons and Faceted Polyhedra and Nanoporous Networks, Angew. Chem. Int. Ed., 40(11):2113-2116 (2001).

Lu, J. Y. et al., A New Type of Two-Dimensional Metal Coordination Systems: Hydrothermal Synthesis and Properties of the First Oxalate-bpy Mixed-Ligand Framework $^2$[(M (ox)(bpy)] (M=Fe(II), Co(II), Ni(II), Zn(II); ox = $C_2O_4^{2-}$; bpy = 4,4'-bipyridine), Inorganic Chem. 38:2695-2704 (1999).

Lu, Q. et al., S. J. Mater. 1:1 (2005).

Maspoch, D. et al., EPR characterization of a nanoporous metal-organic framework exhibiting a bulk magnetic ordering, Journal of Physics and Chemistry of Solids, 65:819-824(2005).

Micklitz, W. et al., Heptadecanuclear mixed metal iron oxo-hydroxo complexes, $[Fe_{16}MO_{10}(OH)_{10}(O_2CPh)_{20}]$ M=Mn or Co, structurally comprised of two fragments derived from $[Fe_{11}O_6(OH)_6(O_2CPh)_{15}]$, Journal American Chemical Society 111:6856-6858 (1989).

Millward, A. R. et al., Metal-Organic Frameworks with Exceptionally High Capacity for Storage of Carbon Dioxide at Room Temperature, Journal of the American Chemical Society, 127:17998-17999 (2005).

Morris, L. et al., Simple system for part-per-billion-level volatile organic compound analysis in groundwater and urban air, Measurement Science and Technology 13:603-612 (2002).

Moulton, B. et al., From Molecules to Crystal Engineering: Supramolecular Isomerism and Polymorphism in Network Solids, Chemical Reviews, 101(6):1629-1658 (2001).

Moulton, B. et al., Nanoballs: nanoscale faceted polyhedra with large windows and cavities, Chem. Commun., 863-864 (2001).

Mueller, U. et al., Metal-organic framework-prospective industrial applications, Journal of Materials Chemistry, 16:626-636 (2006).

Mukhopadhyay, S. et al., Honeycomb Nets with Interpenetrating Frameworks Involving Iminodiacetato-Copper(II) Blocks and Bipyridine Spacers: Syntheses, Characterization, and Magnetic Studies, Inorganic Chemistry 43:3413-3420 (2004).

Murphy, D. L. et al., A chiral, heterometallic metal-organic framework derived from a tris(chelate) coordination complex, Chemistry Communication, 5506-5508 (2005).

Murugavel, R. et al., Extended metal-organic solids based on benzenepolycarboxylic and aminobenzoic acids, Proc. Indian Acad. Sci. (Chem. Sci.) 112(3):273-290 (Jun. 2000).

Nair, V. S. et al., Iron Oxo aggregation: $Fe_3$ to $Fe_6$. Synthesis, Structure, and Magnetic Properties of the Hexanuclear Dication $[Fe_6(\mu_4\text{-}O)_2 (\mu_2\text{-OMe})_8(OMe)_4(tren)_2]^{2+}$, a Soluble, Crystalline Model of Iron Oxo Hydroxo Nanoparticles, the Core of Ferritin and Rust Formation, Inorganic Chemistry 31:4048-4050 (1992).

Natarajan, S. et al., Layered Tin(II) Oxalates Possessing Large Apertures, Chemical Material 11:1633-1639 (1999).

Neogi, S. et al., Metal-organic frameworks of lanthanide (III) ions with a podand bearing terminal carboxylates: Identification of water clusters of different nuclearity, Polyhedron 25:1491-1497 (2006).

Ni, Z. et al., Rapid Production of Metal-Organic Frameworks via Microwave-Assisted Solvothermal Synthesis, J. Am. Chem. Soc., 128:12394-12395 (2006).

O'Keeffe, M. O. et al., Frameworks for Extended Solids: Geometrical Design Principles, Journal of Solid State Chemistry, 152:3-20 (2000).

Pan, L. et al., Separation of Hydrocarbons with a Microporous Metal-Organic Framework, Angew. Chem. Int. Ed., 45:616-619 (2006).

Papaefstathiou, G. S. et al., A 2D metal-organic framework with two different rhombus-shaped cavities: a rare example of a (4,4)-net with alternating metal and organic nodes, Microporous and Mesoporous Materials 71:11-15 (2004).

Papaefstathiou, G. S. et al., Design and Construction of a 2D Metal Organic Framework with Multiple Cavities: A Nonregular Net with a Paracyclophane That Codes for Multiply Fused Nodes, Journal of the American Chemical Society, 127(41):14160-14161 (2005).

Park, G. et al., Solvothermal Synthesis, Crystal Structure, And Magnetic Roperties Of $[Co_3(SDA)_3(DMF)_2]$; 2-D Layered Metal-Organic Framework Dervied From 4,4' Stilbenedicarboxylic Acid ($H_2SDA$), Bull. Korean Chem. Soc. 27(3):443-446 (2006).

Park, J. et al., Temperature and Humidity Compensation in the Determination of Solvent Vapors with a Microsensor System, The Royal Society of Chemistry, Analyst 125:1775-1782 (2000).

Paz, F. A. A. et al., Synthesis and Characterization of a Novel Cadmium-Organic Framework with Trimesic Acid and 1,2-Bis(4-pyridyl)ethane, Inorganic Chemistry 43(13):3948-3954 (2004).

Paz, F. A. A. et al., Synthesis and Characterization of a Novel Modular Cadmium-Organic Framework with Biphenyl-4,4'-dicarboxylate, Eur. J. Inorg. Chem., 2823-2828 (2002).

Plater, M. J. et al., Hydrothermal Synthesis and Characterization of $M(pdc) 3H_2O$) (pdc=2,5-pyridinedicarboxylate); M=Co, Ni, $Co_xNi_y$ (x=0.4-0.6, y=0.6-0.4), Journal of Chemical Research (S), 754-755 (1998).

Poulsen, R. D. et al., Solvothermal synthesis, multi-temperature crystal structures and physical properties of isostructural coordination polymers, $2C_4H_{12}N^+\text{-}[M_3(C_8H_4O_4)_4]^{2-}\bullet 3C_5H_{11}NO$, M= Co,Zn, Acta Crystallographica B62:245-254 (2006).

Prakash, S. et al., Electroosmotic Flow in 'Click' Surface Modified Microfludic Channels, Proceedings of ASME ICNMM2006, 4th International Conference on Nanochannels, Microchannels and Minichannels, Jun. 19-21, 2006 Limerick, Ireland, Paper No. ICNMM2006-96153, 1-7 (2006).

Prestipino, C. et al., Local Structure of Framework (Cu(II) in HKUST-1 Metallorganic Framework: Spectroscopic Characterization upon Activation and Interaction with Adsorbates, Chemical Materials 18:1337-1346 (2006).

Prior, T. J. et al., Designed layer assembly: a three-dimensional framework with 74% extra-framework volume by connection of infinite two-dimensional sheets, Chem. Commun., 500-501 (2003).

Rajic, N. et al., An evidence for a chain to network transformation during the microwave hydrothermal crystallization of an open-framework zinc terephthalate, J. Porous Mater. 13:153-156 (2006).

Raptis, R. G. et al., A $Fe^{III}$/Oxo cubane Contained in an Octanuclear Complex of T Symmetry That Is Stable Over Five Oxidation States, Angew. Chem. Int. Ed. 38(11):1632-1634 (1999).

Rosi, N. L. et al., Hydrogen Storage in Microporous Metal-Organic Frameworks, Science 300:1127-1129 (May 16, 2003).

Rosseinsky, M. J., Recent developments in metal-organic framework chemistry: design, discovery, permanent porosity and flexibility, Microporous and Mesoporous Materials, 73:15-30 (2004).

Rowsell, J. L. C. et al., Metal-organic frameworks: a new class of porous materials, Microporous and Mesoporous Materials 73:3-14 (2004).

Russell, V. A. et al., Nanoporous Molecular Sandwiches: Pillared Two-Dimensional Hydrogen-Bonded Networks With Adjustable Porosity, Science 276:575-579 (Apr. 25, 1997).

Sagara, T. et al., Binding energies of hydrogen molecules to isoreticular metal-organic framework materials, The Journal of Chemical Physics, 123(014701):1-4 (2005).

Sagara, T. et al., New isoreticular metal-organic framework materials for high hydrogen storage capacity, The Journal of Chemical Physics, 123:214707:1-6 (2005).

Schlichte, K. et al., Improved synthesis, thermal stability and catalytic properties of the metal-organic framework compound $Cu_3(BTC)_2$, Microporous and Mesoporous Materials 73:81-88 (2004).

Seo, S. S. et al., A homochiral metal-organic porous material for enantioselective separation and catalysis, Nature 404:982-986 (2000).

Shoner, S. C. et al., Neutral Catecholate Derivatives of Manganese and Iron: Synthesis and Characterization of the Metal-Oxygen Cubane-like Species $M_4(DBCat)_4(py)_6$ (M=Mn, Fe), the Trinuclear Complex $Mn_3(DBCat)_4(py)_4$ and the Dimers $M_2(DBCat)_2(py)n$(M=Mn, $n$=6; M = Fe, $n$=4, 6), Inorganic Chemistry 31:1001-1010 (1992).

Simoes, E. W. et al., Study of preconcentration of non-polar compounds in microchannels with constrictions, Sensors and Actuators B, 115:232-239 (2006).

Smithenry, D. W. et al., A Robust Microporous Zinc Porphyrin Framework Solid, Inorg. Chem. 42(24):7719-7721 (2003).

Stallmach, F. et al. NMR Studies on the Diffusion of Hydrocarbons on the Metal-Organic Framework Material MOF-5, Angew. Chem. Int. Ed. 45:2123-2126 (2006).

Stein, A. et al., Turning Down The Heat: Design and Mechanism in Solid-State Synthesis, Science 259(5101):1558-1564 (Mar. 12, 1993).

Stowell, C. et al., Self-Assembled Honeycomb Networks of Gold Nanocrystals, Nano Letters, 1(11):595-600 (2001).

Su, C.-Y. et al., A three-Dimensional, Noninterpenetrating Metal-Organic Framework with the Moganite Topology: A Simple $(4^2.6^2.8^2)(4.6^4.8)_2$ Net Containing Two Kinds of Topologicall Nonequivalent Points, Inorganic Chemistry, 43:6881-6883 (2004).

Su, C.-Y. et al., Exceptionally Stable, Hollow Tubular Metal-Organic Architectures: Synthesis, Characterization, and Solid-State Transformation Study, Journal of the American Chemical Society, 126:3576-3586 (2004).

Sudik, A. C. et al., A Metal-Organic Framework with a Hierarchical System of Pores and Tetrahedral Building Blocks, Angew. Chem. Int. Ed., 45:2528-2533 (2006).

Sun, S. et al., Monodisperse FePt Nanoparticles and Ferromagnetic FePt Nanocrystal Superlattices, Science 287:1989-1992 (Mar. 17, 2000).

Sun, Z.-G. et al., Guest controlled coordination framework: syntheses, crystal structures and thermal properties of two three-dimensional structures of $[Ce_2(adipate)_3(OH_2)_4]$ • $6H_2O$ and $[Ce_2(adipate)_3(OH_2)_4]$ • $4H_2O$•(adipic acid), Inorganic Chemistry Communications 5:629-632 (2002).

Surble, S. et al., An EXAFS study of the formation of a nanoporous metal-organic framework: evidence for the retention of secondary building units during synthesis, Chem. Commun., 1518-1520 (2006).

Taft, K. L. et al., Iron and Manganese Alkoxide Cubes, Journal of American Chemical Society, 115:11753-11766 (1993).

Taft, K. L. et al., Synthesis, Structure, and Electronic Properties of a Mixed-Valent Dodecairon Oxo Complex, a Model for the Biomineralization of Ferritin, Inorganic Chemistry, 33:1510-1520 (1994).

Tamada, K. et al., The steady two-dimensional flow of viscous fluid at low Reynolds numbers passing through an infinite row of equal parallel circular cylinders, Quart. J. Mech. Appl. Math X(Pt. 4):425-432 (1957).

Tamura, H. et al., Semiconductor Ferromagnetism in Quantum Dot Array, Physical Stat. Sol. (b) 224(3):723-725 (2001).

Tang, Y. et al., A Micro-post Preconcentrator for a Microscale Gas Chromatography System, 2005 Micro Total Analysis Systems Conference (Boston, MA, Oct. 2005); Transducers Research Foundation Proceedings of the 2005 Micro Total Analysis Systems Conference, 660-662 (2005).

Tao, J. et al., Assembly of a microporous metal-organic framework [Zn(bpdc)(DMSO)] (bpdc=4,4'-biphenyldicarboxylate) based on paddle-wheel units affording guest inclusion, Inorganic Chemistry Communications, 5:975-977 (2002).

Tian, W.-C. et al., Microfabricated Preconcentrator-Focuser for a Microscale Gas Chromatograph, Journal of Microelectromechanical Systems, 12(3):264-272 (Jun. 2003).

Tian, Y.-Q. et al., $\{[In_3 (pzdc)_6]^{3-}\}\infty$ Metal-Organic Framework of Distorted NbO-like Net (pzdc = Pyrazine-2,3-dicarboxylato), Chemistry Letters, 32(9):796-797 (2003).

Tran, D. T. et al., Open Metal-Organic Framework Containing Cuprate Chains, Inorganic Chemistry, 44(18):6192-6196 (2005).

Tynan, E. et al., Solvent templated synthesis of metal-organic frameworks: structural characterisation and properties of the 3D network isomers $\{[Mn(dcbp)]$ • ½ $DMF\}n$ and $\{[Mn(dcbp)]$ • $2H_2O\}n$, Chem. Comm., 776-777 (2004).

Vishnyakov, A. et al., Nanopore Structure and Sorption Properties of Cu-BTC Metal-Organic Framework, Nano Letters 3(6):713-718 (2003).

Voiculescu, I. et al., Microconcentrator for Enhanced Trace Detection of Explosives and Chemical Agents, IEEE Sensors Journal, 6(5):1094-1104 (Oct. 2006).

Wang, L. et al., Highly Stable Chiral Cadmium 1,2,4-Benzenetricarboxylate: Synthesis Structure, and NLO and Fluorescence Properties, Inorganic Chemistry, 45(6):2474-2478 (2006).

Wang, L. et al., Two-dimensional metal-organic framework constructed from 4,4'-bipydine and 1,2,4-benzenetricarboxylate: Synthesis, structure and magnetic properties, Journal of Solid State Chemistry, 178:3359-3365 (2005).

Wang, X. et al., Designed double layer assembly: a three-dimensional open framework with two types of cavities by connection of infinite two-dimensional bilayer, Chem. Comm., 378-379 (2004).

Wang, X.-L. et al., An unprecedented eight-connected self-penetrating network based on pentanuclear zinc cluster building blocks, Chem. Commun., 4789-4791 (2005).

Wang, Z. et al., Synthesis and Characterization of a Porous Magnetic Diamond Framework, $Co_3(HCOO)_6$, and Its $N_2$ Sorption Characteristic, Inorganic Chemistry, 44(5):1230-1237 (2005).

Wang, Z. et al., Ternary Nets Formed by Self-Assembly of Triangles, Squares, and Tetrahedra, Angew. Chem. Int. Ed., 44:2877-2880 (2005).

Wei, Q. et al., A manganese metal-organic framework which remains crystalline on desolvation, and which gives insight into the rotational freedom of framework aromatic groups, Microporous and Mesoporous Materials 73:97-100 (2004).

Wen, M. et al., Porous silver(I) organometallic coordination polymer of triptycene, and the guest desorption and absorption, Inorganica Chimica Acta 340:8-14 (2002).

Wen, Y.-H. et al., Hydrothermal syntheses, crystal structures and characterizations of three new copper polymers, Inorganica Chimica Acta, 358:3347-3354 (2005).

Willer, M. W. et al., Ligand Substitution Reactions of $[Re_6S_8Br_6]^{4-}$: A Basis Set of $Re_6S_8$ Clusters for Building Multicluster Assemblies, Inorganic Chemistry 37:328-333 (1998).

Wilson, A. et al., Detection of nitro compounds by organic semiconductor sensors, Sensors and Actuators B, 18-19:511-514 (1994).

Wong-Foy, A. et al., Exceptional $H_2$ Saturation Uptake in Microporous Metal-Organic Frameworks, Journal of the American Chemical Society, 128:3494-3495 (2006).

Wu, C.-D. et al., Hydrothermal synthesis of two new zinc coordination polymers with mixed ligands, Inorganic Chemistry Communications 4:561-564 (2001).

Xie, C.-Z. et al., A Novel 3D $Cu^1$ Metal-Organic Framework With Middle-Size Channels Despite The Sixfold $ThSi_2$ Interpenetrating Topological Structure, Eur. J. Inorg. Chem., 1337-1340 (2006).

Xie, L. et al., A three-dimensional porous metal-organic framework with the rutile topology constructed from triangular and distorted octahedral building blocks, Chem. Commun., 2402-2404 (2005).

Xu, H. et al., Two new microporous coordination polymers constructed by ladder-like and ribbon-like molecules with cavities, Journal of Molecular Structure 693:11-15 (2004).

Xu, X. et al., A Nanoporous Metal-Organic Framework Based on Bulky Phosphane Ligands, Angew. Chem. Int. Ed. 41(5):764-767 (2002).

Yaghi, O. M. et al., Construction of a new open-framework solid from 1,3,5-cyclohexane-tricarboxylate and zinc(II) building blocks, J. Chem. Soc. Dalton Trans., 2383-2384 (1997).

Yaghi, O. M. et al., Construction of Porous Solids from Hydrogen-Bonded Metal Complexes of 1,3,5-Benzenetribcarboxylic Acid, J. Am. Chem. Soc., 118:9096-9101 (1996).

Yaghi, O. M. et al., Crystal Growth of Extended Solids by Nonaqueous Gel Diffusion, Chem. Mater. 9:1074-1076 (1997).

Yaghi, O. M. et al., Hydrothermal Sythesis of a Metal-Organic Framework Containing Large Rectangular Channels, J. Am. Chem. Soc. 117:10401-10402 (1995).

Yaghi, O. M. et al., Reticular synthesis and design of new materials, Nature 423:705-714 (2003).

Yaghi, O. M. et al., Selective binding and removal of guests in a microporous metal-organic framework, Nature 378:703-706 (1995).

Yaghi, O. M. et al., Synthetic Strategies, Structure Patterns, and Emerging Properties in the Chemistry of Modular Porous Solids, Accounts of Chemical Research 31(8):474-484 (1998).

Yaghi, O. M. et al., T-Shaped Molecular Building Units in the Porous Structure of Ag(4,4'-bpy)•$NO_3$, J. Am. Chem. Soc. 118:295-296 (1996).

Yeom, J. et al., Design and Characterization of Micropost-Filled Reactor for the Minimal Pressure Drop and Maximal Surface-Area-to-Volume Ratio, Proceedings of IMECE2006, 2006 ASME International Mechanical Engineering Congress and Exposition, Nov. 5-10, 2006, Chicago, Illinois, USA IMECE2006-15836, 1-5 (2006).

Yildirim, T. et al., Direct Observation of Hydrogen Adsorption Sites and Nanocage Formation in Metal-Organic Frameworks, Physical Review Letters, 95(215504):1-4 (2005).

Zang, S. et al., Interweaving of Triple-Helical and Extended Metal-O-Metal Single-Helical Chains with the Same Helix Axis in a 3D Metal-Organic Framework, Inorganic Chemistry, 45(10):3855-3857 (2006).

Zellers, E. T. et al., Evaluating porous-layer open-tubular capillaries as vapor preconcentrators in a microanalytical system, Sensors and Actuators B 67:244-253 (2000).

Zeng, M.-H. et al., Crystal-to-crystal transformations of a microporous metal-organic laminated framework triggered by guest exchange, dehydration and readsorption, Dalton Trans., 2217-2223 (2004).

Zhang, L.-P. et al., Hydrothermal synthesis and crystal structure of neodymium(III) coordination polymers with isophthalic acid and 1,10-phenanthroline, Polyhedron 22:981-987 (2003).

Zhang, L.-P. et al., Hydrothermal synthesis and crystal structures of three novel lanthanide coordination polymers with glutarate and 1,10-phenanthroline, Journal of Molecular Structure 646:169-178 (2003).

Zhang, X. X. et al., Cooperative magnetic behavior in the coordination polymers [$Cu_3(TMA)_2L_3$] (L=$H_2O$, pyridine), Journal of Applied Physics 87(9):6007-6009 (2000).

Zhang, X.-J. et al., A three-dimensional zinc trimesate framework: [$(CH_3)_2NH_2$][$Zn(C_9H_3O_6)$]•($C_3H_7NO$), Applied Organometallic Chemistry, 19(5):694-695 (2005).

Zhao, X. et al., Hysteretic Adsorption and Desorption of Hydrogen by Nanoporous Metal-Organic Frameworks, Science, 306:1012-1015 (Nov. 5, 2004).

Zheng, C.-G. et al., A novel two-dimensional layer network composed of cadmium and bridging isophthalate ligand, Inorganic Chemistry Communications 4:165-167 (2001).

Zheng, F. et al., Single-Walled Carbon Nanotube Paper as a Sorbent for Organic Vapor Preconcentration, Analytical Chemistry, 78(7):2442-2446 (2006).

Zheng, X.-J. et al., Hydrothermal syntheses, syntheses, structures and magnetic properties of two transition metal coordination polymers with a square grid framework, Polyhedron 23:1257-1262 (2004).

Zou, R.-Q. et al., A hydrogen-bonded 3D coordination network of $Co^{II}$ with 4-(p-benzoxy)-1,2,4-triazole: hydrothermal synthesis, characterization, crystal structure and emission property, Journal of Molecular Structure 737:125-129 (2005).

Zou, R.-Q. et al., Rational assembly of a 3D metal-organic framework for gas adsorption with predesigned cubic building blocks and ID open channels, Chem. Commun., 3526-3528 (2005).

Zou, R.-Q. et al., Strong fluorescent emission of a new fourfold-interpenetrated diamondoid metal-organic framework of zinc(II) urocanate with one-dimensional open channels, Microporous and Mesoporous Materials, 91:233-237 (2006).

* cited by examiner

MOF SYNTHESIS METHOD

STATEMENT REGARDING FEDERALLY-SPONSORED RESEARCH/DEVELOPMENT

This invention was made, at least in part, with U.S. government support under U.S. Air Force Grant No. FA8850-04-1-7121, awarded by the Defense Advanced Research Projects Agency (DARPA). The U.S. government has certain rights in the invention.

CROSS-REFERENCE TO RELATED APPLICATION

This application claims priority under 35 U.S.C. §119(e) to U.S. Provisional Patent Application No. 60/791,988, filed on Apr. 14, 2006, the disclosure of which is expressly incorporated by reference herein in its entirety.

BACKGROUND OF THE INVENTION

1. Field of the Invention

The invention generally relates to the synthesis of metal organic framework (MOF) molecules. In particular, the invention concerns rapid, simple, and versatile methods of producing MOF molecules using microwave assisted synthesis.

2. Related Art

MOFs are organometallic nanoporous structures with high surface area and tailorable selectivity, which makes them suitable for a wide range of applications. They may have a cubic crystalline structure that is formed by copolymerization of metals or metal oxides with organic ligands, resulting in metal-oxide clusters connected by organic linkers. FIG. 1 is a diagram of a typical MOF's 10 crystalline structure including metal or metal oxides, here shown as polyhedrons 12, having polymer ligands 14 extending between them. This highly ordered structure facilitates the creation of interior pores and channels. MOFs are known to have 1-3 nanometer (nm) pores. FIG. 2 is a view of the structure and channels 16 of one of the new MOFs discovered by Applicants and disclosed herein, Zn-MOF-1, and in pending U.S. patent application Ser. No. 11/539,905, filed Oct. 6, 2006, the disclosure of which is expressly incorporated by reference herein in its entirety. As shown in FIG. 2, Zn-MOF-1 has channels 16 of about 10 Å×10 Å. MOF crystals are known to have an average diameter of about 200 microns.

MOFs have been the focus of intense activity in recent years because of their extremely high porosity and tailorable molecular cavities. The surfaces of MOFs' pores and channels increase the overall surface areas of MOFs allowing them to have high porosity that is comparable to or larger than that of zeolites. For example, MOF-5, a known MOF, may have a surface area of about 2900 $m^2/g$ and IRMOF-177 may have a surface area of about 4500 $m^2/g$. The high surface area of MOFs allows them to be used in a wide range of applications. For example, MOFs have been studied for a variety of applications including hydrogen storage, selective sorption, nonlinear optical materials, templates for the creation of molecular species architectures, and as catalysts e.g., catalysts to store $H_2$ (in fuel cells) or $CO_2$.

Applicants have discovered that MOFs have properties that make them highly advantageous as preconcentrators including, for example, high sorption capacity due to their high surface area, high selectivity to specific analytes, inert nature which does not decompose the analyte, thermal stability, and result in unexpectedly high gains in detection. Accordingly, MOFs are used to selectively sorb specific analytes in a preconcentrator. For example, MOFs may be used in particle form, or they may be incorporated into a film inside the preconcentrator. Once the analytes are fully sorbed by the MOFs, the analytes are released by thermal desorption, for example. Then, they can be purged and transferred from the preconcentrator to a detector, for example. The structure and properties of MOFs that make them highly suitable for use as selective sorbents in preconcentrators are discussed below. Details about use of MOFs in a variety of preconcentrators may be found in the above-noted U.S. patent application Ser. No. 11/539,405 filed Oct. 6, 2006.

Numerous methods have been developed for synthesizing MOFs using precursors including a metal precursor and corresponding organic spacing ligand. Solvothermal and hydrothermal synthesis methods using these precursors have conventionally been employed to form MOF crystals. Solvothermal synthesis is a method where precursors for MOF crystal formation are heated in a solvent other than water. In hydrothermal synthesis, precursors for MOF crystals are heated in water. Hydrothermal synthesis is suitable when the ligand precursor is soluble in water. In both conventional solvothermal and hydrothermal synthesis, a solution with MOF precursors is typically maintained at a predetermined equilibrium temperature for an extended period to induce crystallization. Solvothermal and hydrothermal synthesis methods are typically slow, often taking hours and even days.

General information on different known MOFs and conventional synthesis methods are reported in a number of publications, including, "Design and Synthesis of an Exceptionally Stable and Highly Porous Metal-Organic Framework," Yaghi et al., Nature 402 (1999) 276-279; "Interwoven Metal-Organic Framework on a Periodic Minimal Surface with Extra-Large Pores," B. Chen, M. Eddaoudi, Yaghi et al. Science 291 (2001) 1021-1023; "Systematic Design of Pore Size and Functionality in Isoreticular MOFs and Their Application and Methane Storage," Yaghi et al, Science 295 (2002) 469-472; "Reticular Synthesis and Design of New Materials," Yaghi et al., Nature 423 (2003) 705-714; "Hydrogen Storage in Microporous Metal-Organic Frameworks," Yaghi et al., Science 300 (2003) 1127-1129.

As mentioned above, reported solvothermal synthesis methods are slow, typically taking a day or more. U.S. Published Application No. 2003/0004364 discloses a solvothermal process to form MOF materials that takes about one day to several days. In the synthesis method of the above-referenced application, a metal salt and a linear ditropic carboxylate are dissolved in a solvent to form a solution. The solution is then crystallized, which involves at least one of leaving the solution at room temperature, adding a diluted base to the solution to initiate the crystallization, diffusing a diluted base into the solution to initiate the crystallization, and transferring the solution to a closed vessel and heating to a predetermined temperature.

A multi-day hydrothermal synthesis process has also been proposed for the production of nonlinear optically active MOF material. (See e.g., "A Novel Optical Metal-Organic NLO Material Based on a Chiral 2D Coordination Network," Lin, et al., J. Am. Chem. Soc. 1999, 121, 11249-11250.) Others have reported a thermally stable $[Cu_3(TMA)_2(H_2O)_3]_n$ framework structure produced through a 12 hour solvothermal synthesis. (See e.g., "A Chemically Functionalizable Nanoporous Material $[Cu_3(TMA)_2(H_2O)_3]_n$," Chui, et al., Science, 1999, 283, 1148.) Catalytic active homochiral metal-organic materials formed by a two-day liquid diffusion method or solvothermal method have been reported. (See e.g., "A Homochiral Meta-organic Porous Material for Enantioselective Separation and Catalysis," Seo, et al., *Nature*, 2000, 404, 982-986; "A Homochiral Metal-Organic Material with Permanent Porosity, Enantioselective Sorption Properties, and Catalytic Activity", Dybtsev, et al., *Angew. Chem. Int. Ed.*, 2006, 45, 916-920.)

Others have reported porphyrin MOF structures formed by a two-day solvothermal synthesis. (See e.g., "A functional zeolite analogue assembled from metalloporphyrins," Kosal, M. E.; Chou, J.-H., Wilson, S. R.; Suslick, K. S, *Nature Materials*, 2002, 1, 118-121.) Synthesis by one-week deprotonating vapor diffusion has also been reported. (See e.g., "A Robust Microporous Zinc Porphyrin Framework Solid", Smithenry, D. W. et al. *Inorg. Chem.* 2003, 42, 7719.)

Microwave-assisted processes have been used to produce metal particles and oxide particles. Such processes can involve heating a solution with microwaves for a period of an hour or more to produce nano-sized crystals of metal. Typically, metal particle sizes are about 15 nm (Panda A. B.; Glaspell, G. El-Shall, M. S. *J Am. Chem. Soc.* 2006, 128 2790; Lu, Q., Gao, F., Li, D., Komarneni, S. *J. Mater.* 2005 1, 1). Microwave synthesis to provide 5-20 nanometer sized particles of oxides is also known (Tomsett, G. A., Conner, W. C. Yngvesson, K. S. *Chem Phys Chem.* 2006, 296).

Microwave-assisted methods of synthesizing certain types of framework molecules have been studied. For example, Lin et al. (Zhuojia Lin, David S. Wraggg, and Russell E. Morris, "Microwave-assisted synthesis of anionic metal-organic frameworks under ionothermal conditions," *Chem. Commun.*, published May 21, 2006, 2021-2023) describes reactions of metal acetate with trimesic acid in 1-ethyl-3-methyl imidazolium bromide (ionic liquid) under microwave or conventional ionothermal conditions resulting in the formation of novel three-dimensional anionic frameworks templated by the ionic liquid solvent. The anionic MOFs described in Lin et al. were synthesized in ionic liquid, which turns to a liquid media (i.e. melts) only when heated over 80° C. In contrast, the MOFs of this invention use common organic solvents such as diethylformamide(DEF), ethanol and water. Further, in Lin et al. the ionic solvent EMIm (1-ethyl-2-methyl imidazolium bromide) becomes building blocks in the framework structure and carries 2+ charge. In contrast, the MOF of this invention is a neutral framework and can be isolated from the solvent. In addition, the microwave processing time for anionic MOF of Lin et al. is 50 mins; the processing time for the MOFs in this invention is about 1 minute.

In addition, Rajic et al. (N. Rajic, D. Stojakovic, N. Zabukovec Logar, and V. Kaucic, "An evidence for a chain to network transformation during the microwave hydrothermal crystallization of an open-framework zinc terephthalate," *J Porous Mater* 2006, 13: 153-156) discusses methods for synthesizing a 3-D open framework and a chain structured zinc terephthalate using hydrothermal crystallization under microwave heating at 180° C. The MOFs described in Rajic, however, are linear MOFs that do not have the high surface area, high porosity and tailorable molecular cavities that non-linear MOFs produced by conventional hydrothermal and solvothermal methods have. Moreover, they lack high thermal stability. The MOFs of this invention have a 3-D structure that is more robust than linear MOFs because they have coordination bonds in contrast to linear MOFs which have weak Van der Waal bonding. Therefore, the linear MOFs of Rajic are not suitable for a wide range of applications, as are non-linear MOFs.

There is a need for a method of manufacturing MOFs whereby the MOFs can be easily reproduced. There is also a need for a rapid synthesis method for MOFs because rapidly formed MOFs can be more suitably used as research tools for further evaluation. In addition, there is a need for MOFs having a uniform size and shape as well as MOFs which are smaller in size for certain applications. Furthermore, there is a need for a method to make MOFs that produce uniform seeding conditions that can permit secondary grow processes to form larger crystals for used in certain applications.

Thus, rapid methods for the synthesis of non-linear MOFs that have a wide range of applications have not been developed. Accordingly, there is a need for improved methods to rapidly synthesize non-linear MOFs.

SUMMARY OF THE INVENTION

The invention meets the foregoing needs and overcomes the drawbacks and disadvantages of the prior art by providing improved methods of rapidly synthesizing MOF molecules. Microwave-assisted MOF synthesis methods of the invention allow high quality non-linear metal-organic framework crystals to be synthesized in a range of about 5 seconds to about 2.5 minutes. The properties of the crystals made by the microwave-assisted process substantially of the same quality as those produced by the conventional hydrothermal and solvothermal processes, but the synthesis is much more rapid.

In one aspect of the invention, a method for synthesis of non-linear metal organic framework material includes the steps of preparing a reactant solution including metal organic framework precursors, and exposing the reactant solution to a microwave dose sufficient to induce crystallization of non-linear MOF material in the reactant solution.

The microwave dose in the exposing step may exceed about 4 J/cm3, and may be applied for period of between about 5 seconds to about 2.5 minutes. The method of the invention also may include a step of post-processing growth of crystals in the metal organic framework material by one of a solvothermal or hydrothermal process that reaches and maintains a predetermined equilibrium temperature for a predetermined time. The metal organic framework precursors may include a metal precursor and a corresponding spacer ligand in a predetermined ratio, and the amount of metal precursor may be set to achieve a corresponding crystal size in the metal organic framework material. The non-linear metal organic framework material may include a cubic structure. The preparing step may include mixing metal organic framework precursors in a solvent. The method of the invention also may include the step of removing metal organic framework material from the reactant solution after the exposing step.

In yet another aspect of the invention, a process for making a selectively sorbent MOF, Zn-MOF1, having a cubic crystalline structure with crystal sizes in the range from about 10 microns to about 30 microns may include (a) dissolving $Zn(NO_3)_2 \cdot 6H_2O$ (0.18 g, 0.605 mmol) and 4,4',4''',4''''-(21H, 23H-porphine-5-10-15-20-tetrayl)tetrakis(benzoic acid) (0.199 g, 0.252 mmol) in 10 mL diethylformamide; (b) sealing the dissolved solution, and (c) heating in a microwave oven. Zn-MOF1 may be made by following the above process.

In yet another aspect of the invention, a process for making a selectively sorbent MOF, Zn-MOF2, having a cubic crystalline structure with crystal sizes in the range from 2 to 4 microns may include (a) mixing $Zn(NO_3)_2 \cdot 6H_2O$ (0.1 g, 0.336 mmol) and 2-anilino-5-bromoterephthalic acid, (2-anilino-5-BrBDCH2) (0.0847 g, 0.252 mmol; (b) dissolving the mixture in 10 mL diethylformamide; (c) sealing the dissolved mixture; and (d) heating in a microwave oven. Zn-MOF2 may be made by following the above process.

In yet another aspect of the invention, a process for making a selectively sorbent MOF, Zn-MOF3, having a cubic crystalline structure with crystals ranging from 4 to 7 microns, may include (a) mixing $Zn(NO_3)_2 \cdot 6H_2O$ (0.15 g, 0.504 mmol) with 2-trifluoromethoxy terephthalic acid, (2-trifluoromethoxy-BDCH2) (0.0946 g, 0.378 mmol); (b) dissolving the mixture in 10 mL diethylformamide; (c) sealing the dissolved mixture; and (d) heating the dissolved mixture in a microwave oven. Zn-MOF3 may be made by following the above process.

In yet another aspect of the invention, a process for making a selectively sorbent MOF, Zn-MOF4, having crystals of irregular shape may include (a) mixing $Zn(NO_3)_2 \cdot 6H_2O$ (0.1 g, 0.336 mmol) with nitroterephthalic acid (0.0532 g, 0.252 mmol); (b) dissolving the mixture in 10 mL diethylformamide, sealing the dissolved mixture; and (c) heating the dissolved mixture in a microwave oven. Zn-MOF4 may be made by following the above process.

In yet another aspect of the invention, a process for making a selectively sorbent MOF, Zn-MOF5, may include (a) mixing $Zn(NO_3)_2 \cdot 6H_2O$ (0.15 g, 0.504 mmol) with cis-cyclobutane-1,2-dicarboxylic acid (0.0545 g, 0.378 mmol); (b) dissolving the mixture in 10 mL diethylformamide; (c) sealing the dissolved mixture; and (d) heating the dissolved mixture in a microwave oven. Zn-MOF5 may be made by following the above process.

In yet another aspect of the invention, a process for making a selectively sorbent MOF, Cu-MOF1, may include (a) mixing $Cu(NO_3)_2 \cdot 2.5H_2O$ (0.15 g, 0.645 mmol) with 2,5-thiophenedicarboxylic acid (0.0833 g, 0.484 mmol); (b) dissolving the mixture in 10 mL diethylformamide (c) sealing the dissolved mixture; and (d) heating the dissolved mixture in a microwave oven. Cu-MOF1 may be made by following the above process.

In yet another aspect of the invention, a process for making a selectively sorbent MOF, Cu-MOF2, may include (a) mixing $Cu(NO_3)_2 \cdot 2.5H_2O$ (0.1 g, 0.430 mmol) with 2-(trifluoromethoxy)terephthalic acid (2-trifluoromethoxy-$BDCH_2$) (0.0807 g, 0.322 mmol; (b) dissolving the mixture in 10 mL diethylformamide; (c) sealing the dissolved mixture; and (d) heating the dissolved mixture in a microwave oven. Cu-MOF2 may be made by following the above process.

In yet another aspect of the invention, a process for making a selectively sorbent MOF, Tb-MOF1, having a rod-shaped crystalline structure, may include (a) mixing $Tb(NO_3)_3 \cdot 5H_2O$, (0.1 g, 0.230 mmol), with terephthalic acid (BDC) (0.0286 g, 0.172 mmol); (b) dissolving the mixture in 10 mL diethylformamide; (c) sealing the dissolved mixture; and (d) heating the dissolved mixture in a microwave oven. Tb-MOF1 may be made by following the above process.

In yet another aspect of the invention, a process for making a selectively sorbent MOF, Tb-MOF2, may include (a) mixing $Tb(NO_3)_3 \cdot 5H_2O$, (0.1 g, 0.230 mmol), with 2,5-thiophenedicarboxylic acid (0.0297 g, 0.172 mmol); (b) dissolving the mixture in 10 mL diethylformamide; (c) sealing the dissolved mixture; and (d) heating the dissolved mixture in a microwave oven. Tb-MOF2 may be made by following the above process.

In yet another aspect of the invention, a process for making a selectively sorbent MOF, Cd-MOF1, may include (a) mixing $Cd(NO_3)_2 \cdot 4H_2O$, (0.1 g, 0.324 mmol), with cis-cyclobutane-1,2-dicarboxylic acid (0.0350 g, 0.243 mmol); (b) dissolving the mixture in 10 mL diethylformamide; (c) sealing the dissolved mixture; and (d) heating the dissolved mixture in a microwave oven. Cd-MOF1 may be made by following the above process.

In yet another aspect of the invention, a process for making a selectively sorbent MOF, Cd-MOF2, may include (a) mixing $Cd(NO_3)_2 \cdot 4H_2O$ (0.1 g, 0.324 mmol) with nitroterephthalic acid (0.0456 g, 0.216 mmol); (b) dissolving the mixture in 15 mL diethylformamide; (c) sealing the dissolved mixture; and (d) heating the dissolved mixture in a microwave oven. Cd-MOF2 may be made by following the above process.

In yet another aspect of the invention, a process for making a selectively sorbent MOF, Cd-MOF3, may include (a) mixing $Cd(NO_3)_2 \cdot 4H_2O$ (0.1 g, 0.324 mmol) with terephthalic acid (0.0404 g, 0.243 mmol); (b) dissolving the mixture in 10 mL diethylformamide; (c) sealing the dissolved mixture; and (d) heating the dissolved mixture in a microwave oven. Cd-MOF3 may be made by following the above process.

In yet another aspect of the invention, a process for making a selectively sorbent MOF, Co-MOF1, may include (a) mixing $Co(NO_3)_2 \cdot 6H_2O$, (0.1 g, 0.343 mmol), with terephthalic acid (0.0428 g, 0.258 mmol; (b) dissolving the mixture in 10 mL diethylformamide; (c) sealing the dissolved mixture; and (d) heating the dissolved mixture in a microwave oven. Co-MOF1 may be made by following the above process.

In yet another aspect of the invention, a process for making a selectively sorbent MOF, CoMOF-2, may include (a) mixing $Co(NO_3)_2 \cdot 6H_2O$, (0.1 g, 0.343 mmol) with 1,3,5-benzenetricarboxylic acid (0.0542 g, 0.258 mmol); (b) dissolving the mixture in 10 mL diethylformamide; (c) sealing the mixture; and (d) heating in a microwave oven. CoMOF-2 may be made by following the above process. In yet another aspect of the invention, a process for making a selectively sorbent MOF, ZnMOF6, may include (a) mixing $Zn(NO_3)_2 \cdot 6H_2O$ (0.05 g, 0.168 mmol) with 3,3-bis(trifluoromethyl)-1-oxo-5-isobenzofurancarboxylic acid (0.0396 g, 0.126 mmol); (b) dissolving the mixture in 7 mL diethylformamide/3 mL $H_2O$; (c) sealing the dissolved mixture; and (d) heating the dissolved mixture in a microwave oven. ZnMOF6 may be made by following the above process.

In a further aspect of the invention, a process for making a selectively sorbent MOF, Zn-MOF1, having a cubic crystalline structure with crystals in the range of 2 to 4 microns may include (a) dissolving 0.239 g of 4,4',4",4'''-(21H,23H-Porphine-5,10,15,20-tetrayl)tetrakis(benzoic acid) ($H_2TPP$) and 0.18 g of $Zn(NO_3)_2 \cdot 6H_2O$ in 60 mL DEF; (b) stirring the dissolved solution; (c) sealing the dissolved solution in a closed vessel; and (d) heating the vessel to 100° C. at 2° C./minute. Zn-MOF1 may be made by following the above process.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
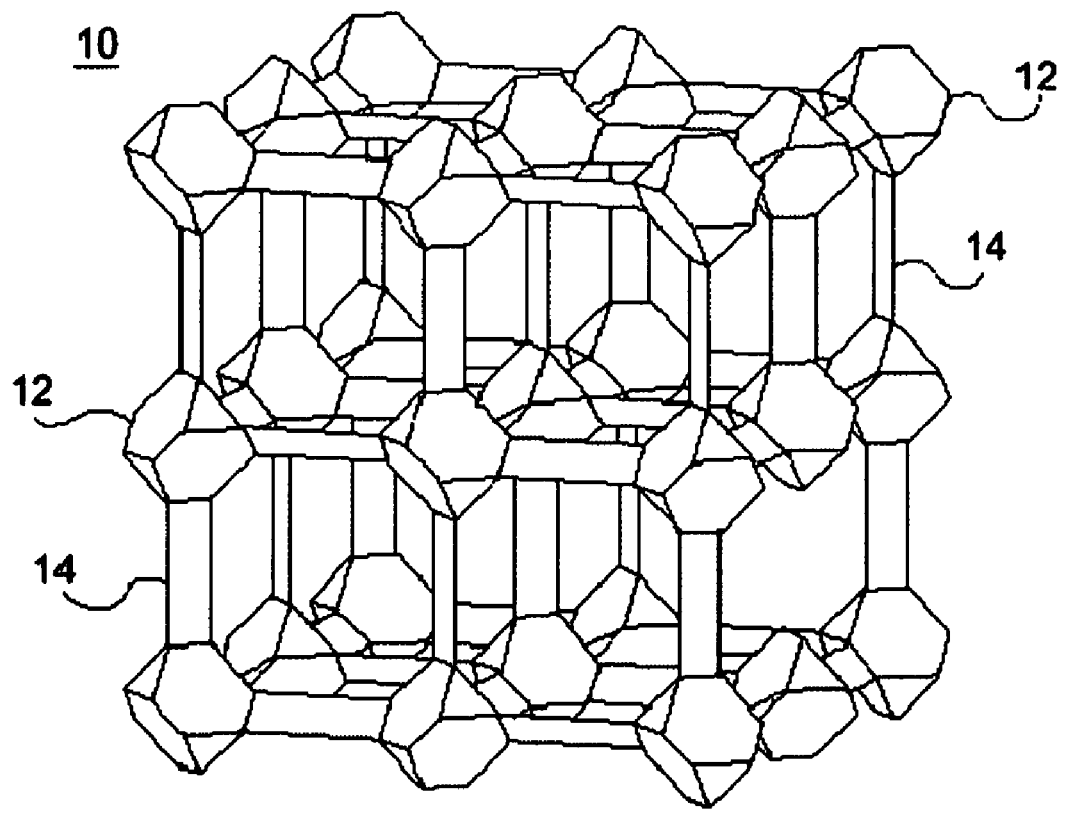
FIG. 1 is a diagram showing a typical crystalline structure of a MOF.
Figure 2:
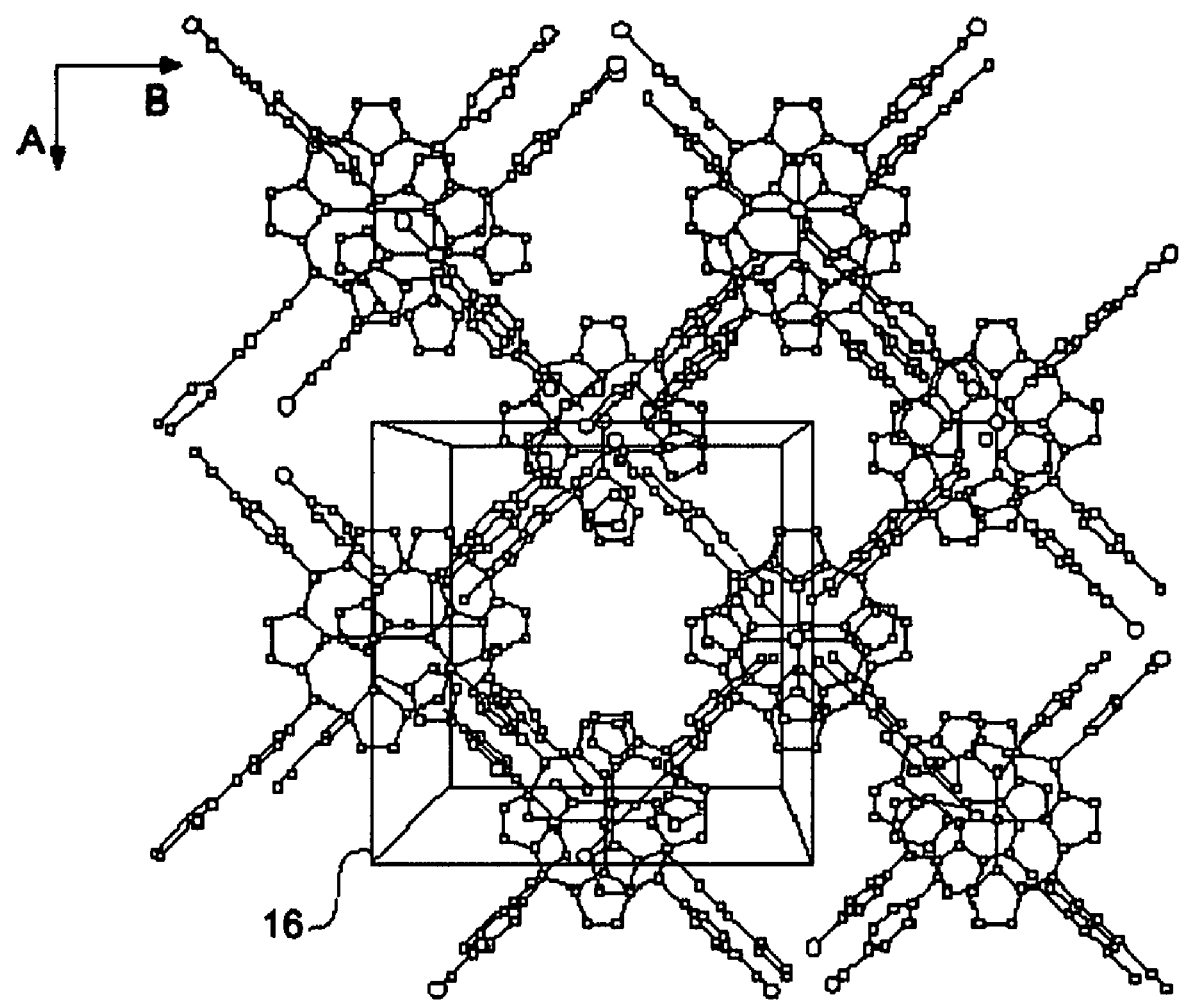
FIG. 2 is a view of the structure and channels of a specific MOF, Zn-MOF1.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

Moreover, it is noted that like reference numerals represent similar parts throughout the several views of the drawings. It is understood that the invention is not limited to the particular methodology, protocols, devices, apparatus, materials, and reagents, etc., described herein, as these may vary. It is also to be understood that the terminology used herein is used for the purpose of describing particular embodiments only, and is not intended to limit the scope of the invention. It must be noted that as used herein and in the appended claims, the singular forms "a," "an," and "the" include plural reference unless the context clearly dictates otherwise. Thus, for example, a reference to "a MOF" is a reference to one or more MOFs and equivalents thereof known to those skilled in the art and so forth.

The term "metal-organic framework," abbreviated "MOF," as used herein, refers to a one, two, or three dimensional polymer including both organic and metal or metal oxide structural units, where at least one of the metal units is bonded to least one bi-, tri- or poly-dentate organic unit.

As an alternative to conventional solvothermal and hydrothermal synthesis methods, the invention provides a rapid, simple, and versatile MOF formation process particularly suited for making non-linear MOFs, including cubic MOFs. According to this method, a reactant solution including MOF precursors is exposed to microwaves for a period of time sufficient to achieve crystallization. The period of time may be, for example, a few seconds to a few minutes or more, depending upon the microwave power and the solution concentration. Example formation times range from about 5 seconds to about 2.5 minutes, which is a significant improvement over the conventional synthesis methods that typically take several hours or days.

In addition to shortened synthesis times, the microwave-assisted MOF synthesis methods of the invention may provide additional advantages. Particularly, the method of the invention provides MOF materials with a well-defined crystalline shape and uniform crystal size. The resulting micro-sized or nano-sized crystals with a size range of about 50 nm to about 10 μm produced by these methods can be engineered for use in many real applications. Reaction conditions may be tailored to provide, for example, particle size control, larger functioning surfaces, or faster sorption kinetics. For example, crystal sizes ranging from micrometers to nanometers are achieved simply by adjusting a few reaction conditions, such as reactant concentration, which are described in detail herein.

The properties of the crystals synthesized by the microwave-assisted methods of the invention are of substantially the same quality as those produced by the standard solvothermal or hydrothermal processes that take a day or more to complete. Although methods of the invention typically do not yield crystals with a size large enough for single X-ray analysis, homogeneous material is formed and may create uniform seeding conditions. This is in contrast with conventional solvothermal growth processes, in which crystals nucleate near the walls or on dust particles. Conventional methods result in slow growth because there are very few seeds.

In addition to being very slow, conventional hydrothermal and solvothermal MOF synthesis methods are difficult to reproduce due to the difficulty in controlling nucleation of MOF particles in the reactant solution. In the microwave-assisted method of the invention, however, crystals are observed throughout the bulk of the solution, presumably because local superheating of the solvent leads to hot spots that nucleate crystal growth. This is advantageous because more seeds lead to faster growth and higher yields.

Once the seeds start to grow during microwave-assisted synthesis, available reactants are quickly depleted. Therefore the size of the crystals may be varied by adjusting the reactant concentration. The ability of the microwave technique to control the nucleation process leads to a narrow size distribution because all of the crystals are nucleated at once. Further, the microwave method of the invention improves reproducibility of MOF synthesis because the nucleation of MOF crystals may be controlled better. It also allows new types of MOFs to be discovered readily since the growth process is not dependent on nucleation on the walls or dust particles. Many novel MOFs previously reported could not be easily replicated, even under the exact same experiment conditions, such as same solvent, concentration and temperature. This is because the inner walls of reaction containers or even dust particles, which are difficult to control, can be important factors that trigger the nucleation of desired MOF seeds. Microwave synthesis of the invention provides highly stable and repeatable results because it is capable of generating numerous nucleation sites by hot spots inside solvent media.

Another advantage of microwave-assisted MOF synthesis of the invention is that it allows one to determine the optimum conditions for crystal growth in a short amount of time. For example, one can use the microwave synthesis method to quickly determine the conditions at which crystals of the desired structure grow, and then repeat the crystal growth under those conditions using conventional methods to obtain larger crystals for use in applications that require larger sized crystals.

In addition, methods of the invention may provide well-defined MOF crystals that may serve as seeds that may be enlarged in post-processes to provide large crystals that may be used in various applications. This is possible because the microwave-assisted formation of MOFs of the invention provides uniform seeding conditions, as described above. The MOF crystals obtained by the microwave synthesis method of the invention are well-suited to be used in conventional secondary growth processes, for example, to form larger crystals, which will be described in detail later.

The methods of the invention may include solvothermal and hydrothermal processes. The solvent used for the reactant solution is dependent upon the organic ligand precursor. Water may be used as the solvent, for example, when the ligand precursor is water soluble. Polar molecule solvents, such as diethyl formamide (DEF) and dimethyl formamide (DMF) for example, are compatible with the mechanism of the microwave assisted synthesis of the invention. Nonpolar solvents, such as benzene, are not suitable because they can not be heated in a microwave. This problem can be solved if necessary by preparing a mixture of polar and non-polar solvent for the microwave synthesis.

Embodiments of the invention will be described with experimental data. Skilled artisans will appreciate broader aspects of the invention from the experimental data. Skilled artisans will also recognize that the laboratory-scaled synthesis methods discussed in the experimental data will be accomplished with different equipment in a commercial scale-up of the methods of the invention. Variations of the synthesis techniques in the experiments will be apparent to skilled artisans. In particular, those skilled in the art will realize that higher power microwaves will yield faster crystallization times up to the diffusion limit (0.05 seconds crystallization time for a 0.05 M solution), which is the minimum concentration of MOF precursors that is required to nucleate a MOF crystal.

In the first set of experiments, microwave synthesis of three known cubic MOFs known as IRMOF-1, IRMOF-2 and IRMOF-3 was conducted. IRMOF-1, IRMOF-2 and IRMOF-3 have been described as isoreticular metal-organic framework molecules (IRMOF) which are cubical 3-D networks of zinc-oxygen clusters connected by molecular struts such as 1,4-benzenedicarboxylate. See, e.g., "Systematic Design of Pore Size and Functionality in Isoreticular MOFs and Their Application in Methane Storage," Yaghi et al, *Science* 295 (2002) 469-472; U.S. Published Patent Application 20030004364 (discloses IRMOFI-IRMOF16 molecules). The IRMOF molecules typically provide pore sizes in increments from 3.8 to 28.8 Å, and pore volumes that range to about 91% of the crystal structure. This class of molecules also includes M-IRMOF molecules, where M is M=Zn, Cd, Be, Mg, and Ca. See, "Electronic Structure and Properties of Isoreticular Metal-Organic Frameworks: The case of M-IRMOF 1 M=Zn, Cd, Be, Mg, and Ca," Fuentes-Cabrera et al., *The Journal of Chemical Physics,* 123, 124713 (2005).

The experiments demonstrated the use of rapid microwave-assisted synthesis of IRMOF-1, -2 and -3 molecules from a reactant solution. In particular, a mixture of metal precursor and corresponding spacing ligand was dissolved in N,N-diethylformamide (DEF) solvent. To create a homogenous seeding environment, the mixture was thoroughly stirred for 15 minutes to obtain a clear solution. The solution was then heated in a microwave for a certain period of time to form MOF crystals.

It was recognized that heating a closed bottle containing volatile solvents and nitrates in a microwave may produce an explosion. Particularly, microwaves create hot spots that can accelerate an explosion. In addition, the pressure in a vessel containing a volatile solvent (e.g., ethanol) may be much higher than with conventional synthesis. Accordingly, conducting the experiments in a high pressure vessel may reduce the potential for explosion.

Further, potential for leakage of reactants from the microwave was also recognized. Accordingly, the experiments were performed by placing the microwave oven (Sharp R209HK 0.8 ft$^3$ microwave oven, 800 W, exterior dimensions 18-⅛" W×14" D×10-⅞" H) in a hood with a blast shield positioned in front of the sample vial. In addition, a lab grade microwave reactor module, such as a 300 W Discover LabMate, may also be used. Such microwave reactors may provide additional safety, allow more uniform heating than household microwave ovens, and may enable data connections to monitor reaction conditions.

To synthesize IRMOF-1, an exact amount of $Zn(NO_3)_2 \cdot 6H_2O$ (0.2 g, 0.67 mmol) and 1,4-benzenedicarboxylate acid ($BDCH_2$) (0.083 g, 0.50 mmol) were dissolved in 10 mL of the N,N'-diethylformamide (DEF) resulting in a clear solution. The solution was then sealed in a Pyrex sample vial and heated in a household microwave oven (800 W) for a reaction time varied from 30 sec to 1 min. A yellow suspension formed after the microwave treatment. The product was rinsed (centrifuged and re-dispersed in DEF by sonicating) for 3 times before analysis. Assuming that between 1 and 100% of the microwave power output was adsorbed by the DMF solution, then a 30 second heating cycle corresponded to a microwave dose of between 24 and 4800 joules/cm$^3$.

Similarly, IRMOF-2 was synthesized by dissolving an exact amount of 2-bromoterephthalic acid, (2-$BrBDCH_2$) (0.040 g, 0.160 mmol), and zinc nitrate tetrahydrate, $Zn(NO_3)_2 \cdot 4H_2O$, (0.0594 g, 0.20 mmol), 15 mL of diethylformamide. The solution was then sealed with a Pyrex sample vial and heated with a household microwave oven (800 W) for a reaction time of 80 sec. A yellow suspension formed after the microwave treatment. Assuming that between 1 and 100% of the microwave power output was adsorbed by the DMF solution, a microwave dose of between 64 and 6400 joules/$cm^3$ was delivered, which is explained in detail below.

Further, IRMOF-3 was synthesized by dissolving an exact amount of 2-aminoterephthalic acid, (2-Amino-$BDCH_2$) (0.2 g, 0.67 mmol) and zinc nitrate tetrahydrate, $Zn(NO_3)_2 \cdot 4H_2O$, (0.0913 g, 0.504 mmol), in a mixture of 39 mL diethylformamide and 3 mL ethanol. The solution was then sealed with a Pyrex sample vial and heated with a household microwave oven (800 W) for a reaction time of 60 sec. An orange suspension formed after the microwave treatment.

Figure 3:
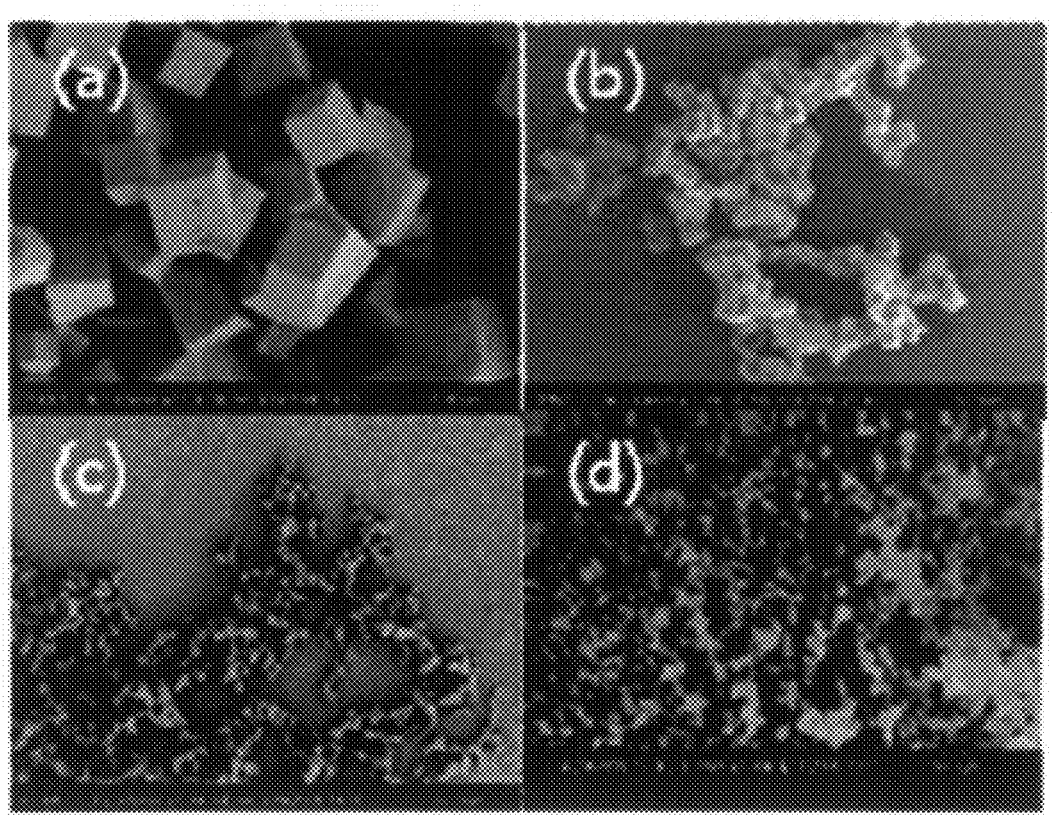
FIG. 3 shows (a) Enlarged SEM image of micro IRMOF-1; (b) SEM image of micro IRMOF-1; (c) SEM image of micro IRMOF-2; and (d) SEM image of micro IRMOF-3.

The resulting suspended particles of IRMOF-1 were found to be microsized cubic crystals, as shown in FIG. 3 a, b, with an average size of 5±1 μm. Particles of the obtained IRMOF-2 in FIG. 3c and IRMOF-3 in FIG. 3d also showed the same cubic morphology with a different size. Specifically, IRMOF-2 has a size of 3±2 μm; IRMOF-3 has a size of 3±1 μm. Overall, the micro crystals that were formed had relatively uniform size and identical cubic morphology.

Figure 4:
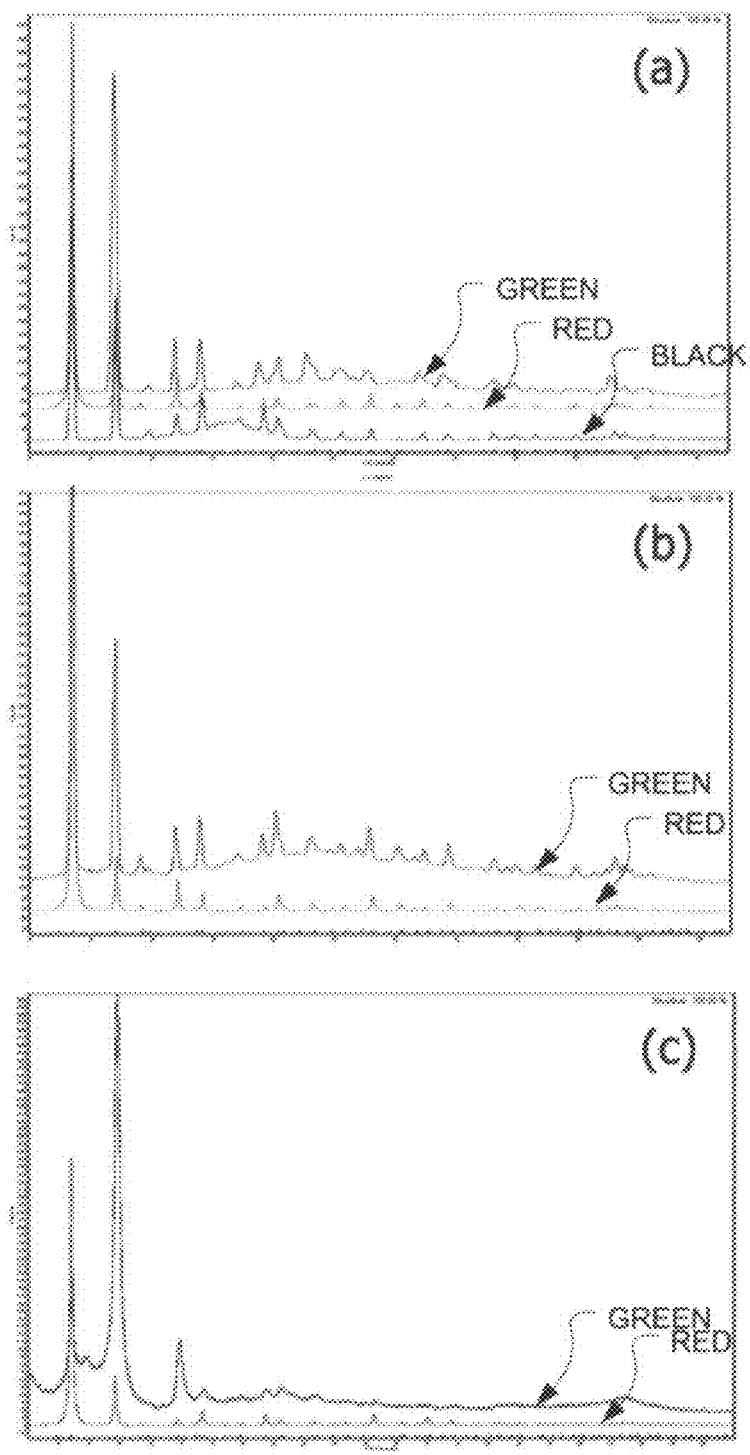
FIG. 4 shows XRPD patterns of (a) IRMOF-1, (b) IRMOF-2, and (c) IRMOF-3 prepared by the solvothermal synthesis of Eddaoudi, M. et al. (Eddaoudi M., Kim, J., Rosi, N., Vodak, D., Wachter, J., O'Keeffe, M., Yaghi, O. M. *Science* 2002, 295, 469) (referenced by the arrow labeled black) and by microwave-assisted solvothermal synthesis (referenced by the arrow labeled green) and a simulated XRPD curve based on the published structure of Eddaoudi, M. et al. (referenced by the arrow labeled red)

The cubic structures of IRMOF species are further supported by X-ray powder diffraction (XRPD) results as shown in FIG. 4. FIG. 4 shows XRPD patterns of (a) IRMOF-1, (b) IRMOF-2, and (c) IRMOF-3 prepared by the solvothermal synthesis of Eddaoudi, M. et al. (Eddaoudi M., Kim, J., Rosi, N., Vodak, D., Wachter, J., O'Keeffe, M., Yaghi, O. M. Science 2002, 295, 469) (referenced by the arrow labeled black) and by microwave-assisted synthesis of the invention (referenced by the arrow labeled green) and a simulated XRPD curve based on the published structure of Eddaoudi, M. et al. (referenced by the arrow labeled red). As evident from FIGS. 4a, b, and c, IRMOF-1, IRMOF-2, and IRMOF-3 synthesized by microwave-assisted methods of the invention had XRPD patterns that closely matches the patterns produced by Eddaoudi's synthesis method and Eddaoudi's simulated structure.

The experiments also demonstrated that crystal size can be varied from micrometer down to nanometer scale by manipulating the concentration of reactant solution. Smaller particles can be obtained by reducing the reactant concentration in a starting solution. In the synthesis of small IRMOF-1 crystals, the concentration of $BDCH_2$ was diluted from 0.05 to 0.0002 M. In particular, nine different concentrations of $BDCH_2$ were prepared: 0.05 M, 0.025 M, 0.0125 M, 0.00625 M, 0.003125 M, 0.001563 M, 0.000781 M, 0.000391 M, 0.000195 M and the amount of zinc precursor was changed correspondingly so the metal/ligand molar ratio remained 4:3. The microwave treatments were also extended up to 90 seconds when the solution was diluted, corresponding to a microwave dose between 72 and 7200 $J/cm^3$. An approximately 8 second increase in heating time was needed when the concentration is diluted in half.

Figure 5:
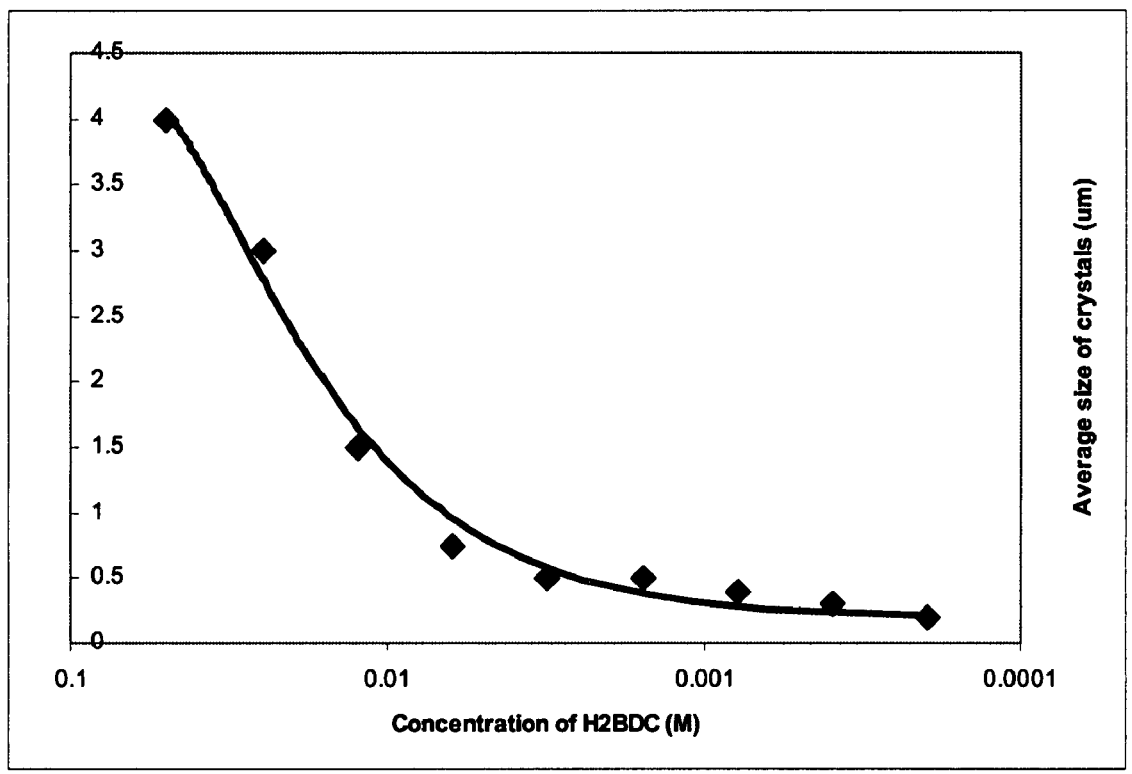
FIG. 5 is a plot showing the dependence of the size of IRMOF-1 crystals on the concentration of $BDCH_2$ in a reactant solution exposed to microwaves in experiments conducted in accordance with embodiments of the invention.

FIG. 5 is a plot showing the estimated average size of IRMOF-1 microcrystal versus concentration of $BDCH_2$ in the reactant solution. FIG. 5 demonstrates that particle size varied as the reactant concentration changed. In particular, nanosized crystals were formed when the reactant concentration was scaled down to a few μM.

Figure 6:
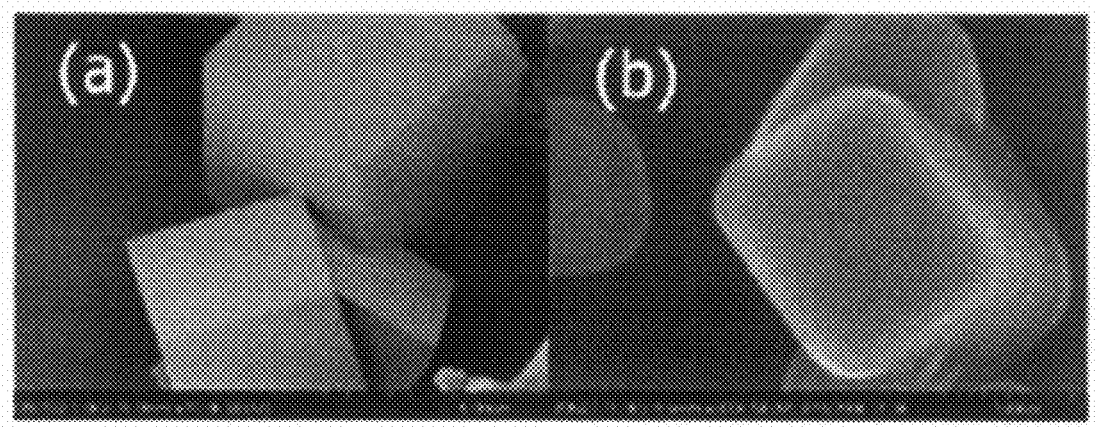
FIG. 6 shows enlarged SEM images of IRMOF-1 synthesized from $BDCH_2$ concentrations of (a) 0.05 M and (b) 0.0002 M.

FIG. 6 shows enlarged SEM images of IRMOF-1 synthesized from $BDCH_2$ concentrations of (a) 0.05 M and (b) 0.0002 M. The edge and vertex of the nano-sized crystal shown in 6b are observed to be less sharp than those of microsized crystals shown in 6a.

The effect of microwave reaction time on crystal formation was also investigated. No crystal formation was observed when the microwave time was under 20 sec. By varying the reaction time from 25 seconds to 1 minute, the size of the microcrystals remained substantially consistent. At somewhat larger doses, the glass bottles shattered.

The amount of energy supplied to each sample vial was estimated to determine the approximate amounts of energy required to induce MOF synthesis. Published studies (See "Microwave Power Absorption In Single- And Multiple-Item Foods" by Zhang and Datta, Trans IChemE, Vol 81, Part C, p. 257-265 (2003)) have shown that between 1 and 100% of the energy output of a conventional microwave oven is adsorbed by common foods. In general, the maximum microwave dose may be estimated using the following Equation (1).

$$\text{Maximum dose} = \lambda/(1-L) \quad (1)$$

where λ is the heat of vaporization of the solvent per unit volume (i.e. about 700 J/cc for DMF) and L is the fraction of the heat that is lost to the surroundings (about 95% in the above experiments). Thus, the maximum microwave dose was estimated to be about 14000 J/cc. Optimum microwave doses were between 24 and 11000 $J/cm^3$.

Other MOF materials were also synthesized using the rapid microwave MOF synthesis method of the invention. In particular, $[Zn(p\text{-}COO)TPP]_n$: 0.239 g 4,4',4'',4'''-(21H,23H-Porphine-5,10,15,20-tetrayl) tetrakis(benzoic acid) ($H_2TPP$) and 0.18 g $Zn(NO_3)_2 \cdot 6H_2O$ were dissolved in 60 mL N,N'-diethylformamide (DEF). The solution was then sealed with a Pyrex sample vial and heated with a household microwave oven (800 W) for a reaction time of 60 sec. This corresponds to a microwave dose between 48 and 4800 $J/cm^3$. A dark purple suspension formed after the microwave treatment. The obtained crystals were square shaped, with bowed sides. XRPD analysis showed the crystals to have two dimensional $[Zn(pCOO)TPP]_n$ networks in the xy plane and stacking along the z-axis.

In another experiment, CoMOF-1 was synthesized by dissolving an exact amount of 1,4-benzenedicarboxylate acid ($BDCH_2$) (0.086 g, 0.51 mmol), and an exact amount of cobalt (II) nitrate hexahydrate, $Co(NO_3)_2 \cdot 6H_2O$, (0.1 g, 0.343 mmol) and 1,4-benzenedicarboxylate acid ($BDCH_2$) (0.0428 g, 0.258 mmol) in 10 mL diethylformamide. The solution was then sealed with a Pyrex sample vial and heated with a household microwave oven (800 W) for a reaction time of 60 sec. This corresponds to a microwave dose between 48 and 4800 $J/cm^3$. A purple suspension formed after the microwave treatment. The resulting crystals had flattened a cubooctahedral shape.

In another embodiment of the invention, several novel nonlinear MOFs were synthesized by Applicants using the microwave synthesis method of the invention, as described in the following Examples 1-15. It will be recognized that these novel MOFs may also be made by any other methods known in the art.

EXAMPLE 1

Zn-MOF-1 synthesis: An exact amount of zinc nitrate hexahydrate, $Zn(NO_3)_2 \cdot 6H_2O$, (0.18 g, 0.605 mmol) and 4,4',4'',4'''-(21H,23H-porphine-5-10-15-20-tetrayl)tetrakis (benzoic acid), (0.199 g, 0.252 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$. The crystals obtained were dark purple with a cubic shape with sizes ranging from about 10 to about 30 microns.

EXAMPLE 2

Zn-MOF-2 synthesis: An exact amount of zinc nitrate hexahydrate, $Zn(NO_3)_2*6H_2O$, (0.1 g, 0.336 mmol) and 2-anilino-5-bromoterephthalic acid, (2-anilino-5-BrB-DCH2) (0.0847 g, 0.252 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$. The obtained crystals were light yellow with a cubic shape with sizes ranging from 2 to 4 microns.

EXAMPLE 3

Zn-MOF-3 synthesis: An exact amount of zinc nitrate hexahydrate, $Zn(NO_3)_2*6H_2O$, (0.15 g, 0.504 mmol) and 2-trifluoromethoxy terephthalic acid, (2-trifluoromethoxy-BDCH2) (0.0946 g, 0.378 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$. The obtained crystals were yellow with a cubic shape, with sizes ranging from about 4 to about 7 microns.

EXAMPLE 4

Zn-MOF-4 synthesis: An exact amount of zinc nitrate hexahydrate, $Zn(NO_3)_2*6H_2O$, (0.1 g, 0.336 mmol) and nitroterephthalic acid, (0.0532 g, 0.252 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$. The obtained crystals had an irregular shape.

EXAMPLE 5

Zn-MOF-5 synthesis: An exact amount of zinc nitrate hexahydrate, $Zn(NO_3)_2*6H_2O$, (0.15 g, 0.504 mmol) and cis-cyclobutane-1,2-dicarboxylic acid (0.0545 g, 0.378 mmol) were dissolved in 10 mL diethylformamide. The solution was then sealed with a Pyrex sample vial and heated with a household microwave oven (800 W) for a reaction time of 105 seconds. This corresponds to a microwave dose between 84 and 8400 $J/cm^3$. The obtained crystals had a square plate shape.

EXAMPLE 6

Cu-MOF-1 synthesis: An exact amount of cupric nitrate, $Cu(NO_3)_2*2.5H_2O$, (0.15 g, 0.645 mmol) and 2,5-thiophenedicarboxylic acid, (0.0833 g, 0.484 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$.

EXAMPLE 7

Cu-MOF-2 synthesis: An exact amount of cupric nitrate, $CU(NO_3)_2*2.5H_2O$, (0.1 g, 0.430 mmol) and 2-(trifluoromethoxy)terephthalic acid (2-trifluoromethoxy-$BDCH_2$) (0.0807 g, 0.322 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$.

EXAMPLE 8

Tb-MOF-1 synthesis: An exact amount of terbium (III) nitrate pentahydrate, $Tb(NO_3)_3*5H_2O$, (0.1 g, 0.230 mmol) and terephthalic acid (BDC) (0.0286 g, 0.172 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$. The obtained crystals had a rod shape.

EXAMPLE 9

Tb-MOF-2 synthesis: An exact amount of terbium (III) nitrate pentahydrate, $Tb(NO_3)_3*5H_2O$, (0.1 g, 0.230 mmol) and 2,5-thiophenedicarboxylic acid (0.0297 g, 0.172 mmol) were dissolved in 10 mL diethylformamide. The solution was then sealed with a Pyrex sample vial and heated with a household microwave oven (800 W) for a reaction time of 80 seconds. This corresponds to a microwave dose between 64 and 6400 $J/cm^3$.

EXAMPLE 10

Cd-MOF-1 synthesis: An exact amount of cadmium nitrate hexahydrate, $Cd(NO_3)_2*4H_2O$, (0.1 g, 0.324 mmol) and cis-cyclobutane-1,2-dicarboxylic acid (0.0350 g, 0.243 mmol) were dissolved in 10 mL diethylformamide. The solution was then sealed with a Pyrex sample vial and heated with a household microwave oven (800 W) for a reaction time of 60 seconds. This corresponds to a microwave dose between 48 and 4800 $J/cm^3$.

EXAMPLE 11

Cd-MOF-2 synthesis: An exact amount of cadmium nitrate tetrahydrate, $Cd(NO_3)_2*4H_2O$, (0.1 g, 0.324 mmol) and nitroterephthalic acid (0.0456 g, 0.216 mmol) were dissolved in 15 mL diethylformamide. The solution was then sealed with a Pyrex sample vial and heated with a household microwave oven (800 W) for a reaction time of 60 seconds. This corresponds to a microwave dose between 48 and 4800 $J/cm^3$;

EXAMPLE 12

Cd-MOF-3 synthesis: An exact amount of cadmium nitrate tetrahydrate, $Cd(NO_3)_2*4H_2O$, (0.1 g, 0.324 mmol) and terephthalic acid (0.0404 g, 0.243 mmol) were dissolved in 10 mL diethylformamide. The solution was then sealed with a Pyrex sample vial and heated with a household microwave oven (800 W) for a reaction time of 90 seconds. This corresponds to a microwave dose between 72 and 7200 $J/cm^3$.

EXAMPLE 13

Co-MOF-1 synthesis: An exact amount of cobalt (II) nitrate hexahydrate, $Co(NO_3)_2*6H_2O$, (0.1 g, 0.343 mmol) and terephthalic acid (0.0428 g, 0.258 mmol) were dissolved in 10 mL diethylformamide. The solution was then sealed with a Pyrex sample vial and heated with a household microwave oven (800 W) for a reaction time of 60 seconds. This corresponds to a microwave dose between 48 and 4800 $J/cm^3$.

EXAMPLE 14

Co-MOF-2 synthesis: An exact amount of cobalt (II) nitrate hexahydrate, $Co(NO_3)_2*6H_2O$, (0.1 g, 0.343 mmol)

and 1,3,5-benzenetricarboxylic acid (0.0542 g, 0.258 mmol) were dissolved in 10 mL diethylformamide. The solution was then sealed with a Pyrex sample vial and heated with a household microwave oven (800 W) for a reaction time of 60 seconds. This corresponds to a microwave dose between 48 and 4800 J/cm$^3$.

EXAMPLE 15

Zn-MOF-6 synthesis: An exact amount of zinc nitrate hexahydrate, $Zn(NO_3)_2 \cdot 6H_2O$, (0.05 g, 0.168 mmol) and 3,3-bis(trifluoromethyl)-1-oxo-5-isobenzofurancarboxylic acid (0.0396 g, 0.126 mmol) were dissolved in 7 mL diethylformamide/3 mL $H_2O$. The solution was then sealed with a Pyrex sample vial and heated with a household microwave oven (800 W) for a reaction time of 120 seconds. This corresponds to a microwave dose between 96 and 9600 J/cm$^3$. The obtained crystals had a hexagonal cylinder shape, with size ranging from about 2 to about 4 microns.

In Comparative Examples 16 and 17, MOF-5, a known non-linear MOF, was synthesized according to the methods described in U.S. Patent Publication No. 2005/0192175 so that it could later be compared with MOF-5 synthesized by the microwave method of the invention, which is described herein. In Examples 18-34, specific known MOFs were synthesized using microwave synthesis.

COMPARATIVE EXAMPLE 16

50-1,000 micron MOF-5 synthesis: 0.200 g $Zn(NO_3)_2 \cdot 6H_2O$ and 0.084 g 1,4-dibenzenedicarboxylate ($H_2BDC$) ligand in were dissolved 20 mL N,N'diethylformamide (DEF). The solution was stirred for 30 minutes and then heated in a closed vessel at 80° C. After 1-3 days, small transparent crystals were obtained with a size distribution between about 50 and about 1,000 microns.

COMPARATIVE EXAMPLE 17

30-50 micron MOF-5 synthesis: The MOF-5 crystals in Comparative Example 16 were ground with a mortar and pestle. They were then sorted with a 120 mesh sieve to produce particles that were between about 30 and about 45 microns in diameter.

EXAMPLE 18

4-6 micron MOF-5 synthesis: An exact amount of $Zn(NO_3)_2 \cdot 6H_2O$ (0.2 g, 0.67 mmol) and 1,4-benzenedicarboxylate acid ($BDCH_2$) (0.083 g, 0.50 mmol) were dissolved in 10 mL of the N,N'-diethylformamide (DEF) resulting in a clear solution. One mL of the solution was sealed in a 4-mL Pyrex sample vial. The vial was then placed inside a hood behind a blast shield and heated by a microwave synthesizer (Resonance Instrument Inc. Model 520A) at 150 W for about 25 seconds. This corresponds to a microwave dose between 38 and 3800 J/cm$^3$. A yellow suspension formed after the microwave treatment. The product was rinsed (centrifuged and re-dispersed in DEF by sonicating) for 3 times before analysis. Light yellow crystals with a particle size of about 4-6 microns were observed.

EXAMPLE 19

3 micron MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 25 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 33 seconds. This corresponds to a microwave dose between 50 and 5000 J/cm$^3$. A yellow suspension formed after the microwave treatment. The product was rinsed (centrifuged and re-dispersed in DEF by sonicating) for 3 times before analysis. Light yellow crystals with average particle size of about 3 micron were observed.

EXAMPLE 20

1.5 micron MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 12.5 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 41 seconds. This corresponds to a microwave dose between 62 and 6200 J/cm$^3$. A yellow suspension formed after the microwave treatment. The product was rinsed (centrifuged and re-dispersed in DEF by sonicating) for 3 times before analysis. Light yellow crystals with average particle size of about 1.5 micron were observed.

EXAMPLE 21

0.75 micron MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 6.25 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 49 seconds. This corresponds to a microwave dose between 74 and 7400 J/cm$^3$. A yellow suspension formed after the microwave treatment. The product was rinsed (centrifuged and re-dispersed in DEF by sonicating) for 3 times before analysis. Light yellow crystals with average particle size of about 0.75 micron were observed.

EXAMPLE 22

MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 3.13 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 57 seconds. This corresponds to a microwave dose between 86 and 8600 J/cm$^3$. A yellow suspension formed after the microwave treatment. The product was rinsed (centrifuged and re-dispersed in DEF by sonicating) for 3 times before analysis. Light yellow crystals with average particle size of about 0.5 micron were observed.

EXAMPLE 23

MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 1.56 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 65 seconds. This corresponds to a microwave dose between 98 and 9800 $J/cm^3$. A yellow suspension formed after the microwave treatment. The product was rinsed (centrifuged and re-dispersed in DEF by sonicating) for 3 times before analysis. Light yellow crystals with an average particle size of about 0.5 micron were observed.

EXAMPLE 24

0.4 micron MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 0.78 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 73 seconds. This corresponds to a microwave dose between 110 and 11000 $J/cm^3$. A yellow suspension formed after the microwave treatment. The product was rinsed (centrifuged and re-dispersed in DEF by sonicating) for 3 times before analysis. Light yellow crystals with average particle size of 0.4 micron were observed.

EXAMPLE 25

0.3 micron MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 0.39 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 81 seconds. This corresponds to a microwave dose between 120 and 12000 $J/cm^3$. A yellow suspension formed after the microwave treatment. The product was rinsed (centrifuged and re-dispersed in DEF by sonicating) for 3 times before analysis. Light yellow crystals with average particle size of 0.3 micron were observed.

EXAMPLE 26

100-300 nm MOF-5 synthesis: An exact amount of $Zn(NO_3)_2 \cdot 6H_2O$ (0.2 g, 0.67 mmol) and $BDCH_2$ (0.083 g, 0.50 mmol) were dissolved in 10 mL of the N,N'-diethylformamide (DEF) resulting in a clear solution. The solution was diluted with DEF until the $BDCH_2$ concentration was approximately 0.20 mmol/L. One mL of the solution was sealed in a 4-mL Pyrex sample vial. The vial was then placed inside a hood behind a blast shield and heated by a microwave synthesizer (Resonance Instrument Inc. Model 520A) at 150 W for about 90 seconds. This corresponds to a microwave dose between 140 and 13500 $J/cm^3$. A yellow suspension formed after the microwave treatment. The product was rinsed (centrifuged and re-dispersed in DEF by sonicating) for 3 times before analysis. Light yellow crystals with average particle size of about 0.1 to about 0.3 microns (i.e. 100 to 300 nm) were observed.

EXAMPLE 27

IRMOF-2 synthesis: An exact amount of 2-bromoterephthalic acid, ($2$-$BrBDCH_2$) (0.040 g, 0.160 mmol), and zinc nitrate hexahydrate, $Zn(NO_3)_2 \cdot 6H_2O$, (0.0594 g, 0.20 mmol) were dissolved in 15 mL diethylformamide. The solution was then sealed with a Pyrex sample vial and heated at 150 W for a reaction time of about 40 seconds. This corresponds to a microwave dose between 60 and 6000 $J/cm^3$. A yellow suspension formed after the microwave treatment.

EXAMPLE 28

IRMOF-3 synthesis: An exact amount of 2-aminoterephthalic acid, ($2$-$Amino$-$BDCH_2$) (0.2 g, 0.67 mmol) and zinc nitrate hexahydrate, $Zn(NO_3)_2 \cdot 6H_2O$, (0.0913 g, 0.504 mmol) were dissolved in a mixture of 39 mL diethylformamide and 3 mL ethanol. The solution was then sealed with a Pyrex sample vial and heated at 150 W for a reaction time of about 35 seconds. An orange suspension formed after the microwave treatment.

EXAMPLE 29

$Cu(4,4'$-$bpy)_{1.5}NO_3(H_2O)_{1.25}$ synthesis according to microwave methods of the invention using reactant concentrations as described in detail in *JACS* 1995, 117, 10401-10402: An exact amount of $Cu(NO_3)_2 \cdot 2.5H_2O$ (0.1133 g, 0.487 mmol), 4,4'-dipyridyl (0.114 g, 0.730 mmol), and 1,3,5-triazine (0.026 g, 0.323 mmol) were dissolved in 15 mL of deionized water. The solution was then sealed with a Pyrex sample vial and heated with a household microwave oven (800 W) for a reaction time of about 60 seconds. This corresponds to a microwave dose between 48 and 4800 $J/cm^3$.

EXAMPLE 30

$[Cu_3(TMA)_2]_n$ synthesis according to microwave methods of the invention using reactant concentrations as described in detail in *Science* 1999, 283, 1148-1150: An exact amount of cupric nitrate $Cu(NO_3)_2 \cdot 2.5H_2O$ (0.1 g, 0.430 mmol) and 1,3,5-benzene-tricarboxylic acid (0.05 g, 0.239 mmol) were dissolved in 10 mL of DEF. The solution was then sealed with a Pyrex sample vial and heated with a household microwave oven (800 W) for a reaction time of about 60 seconds. This corresponds to a microwave dose between 48 and 4800 $J/cm^3$.

EXAMPLE 31

$[Cu(OH)$—$(C_5H_4NCO_2]_n$ synthesis according to microwave methods of the invention using reactant concentrations as described in detail in *Inorg. Chem.* 2005, 44, 6192-6196: An exact amount of cupric nitrate $Cu(NO_3)_2 \cdot 2.5H_2O$ (0.1 g, 0.430 mmol) and isonicotinic acid (0.067 g, 0.430 mmol) were dissolved in 4 mL of deionized water. The solution was then sealed with a Pyrex sample vial and heated with a household microwave oven (800 W) for a reaction time of about 60 seconds. This corresponds to a microwave dose between 48 and 4800 J/cm$^3$.

EXAMPLE 32

MOF-38 synthesis according to microwave methods of the invention using reactant concentrations as described in detail in *JACS*, 2001, 123, 8239-8247: An exact amount of zinc nitrate hexahydrate, $Zn(NO_3)_2 \cdot 6H_2O$ (0.1 g, 0.336 mmol) and 1,3,5-benzene-tricarboxylic acid (0.039 g, 0.187 mmol) were dissolved in 10 mL of DEF. The solution was then sealed with a Pyrex sample vial and heated with a household microwave oven (800 W) for a reaction time of about 60 seconds. This corresponds to a microwave dose between 48 and 4800 J/cm$^3$.

EXAMPLE 33

$Ag(4,4'-bpy)NO_3$ synthesis according to microwave methods of the invention using reactant concentrations as described in detail in *JACS*, 1996, 118, 295-296: An exact amount of silver nitrate, $AgNO_3$ (0.050 g, 0.294 mmol) and 4,4'-dipyridyl (0.051 g, 0.325 mmol) were dissolved in 10 mL of deionized water. The solution was then sealed with a Pyrex sample vial and heated with a household microwave oven (800 W) for a reaction time of about 60 seconds. This corresponds to a microwave dose between 48 and 4800 J/cm$^3$.

EXAMPLE 34

IRMOF-7 synthesis: An exact amount of 1,4 naphthalene dicarboxylic acid, (0.109 g, 0.504 mmol) and zinc nitrate hexahydrate, $Zn(NO_3)_2 \cdot 6H_2O$, (0.2 g, 0.673 mmol) were dissolved in a 15 mL diethylformamide. The solution was then sealed with a Pyrex sample vial and heated with a household microwave oven (800 W) at 150 W for a reaction time of about 60 seconds.

Figure 7:
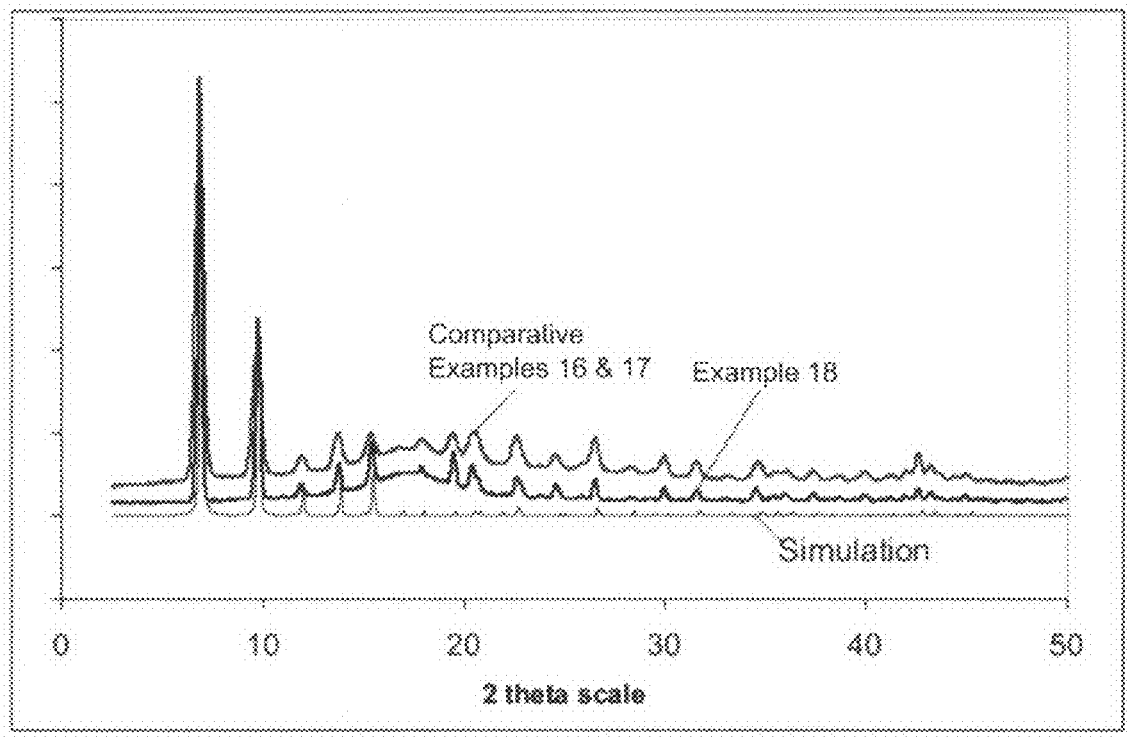
FIG. 7 is a plot showing an x-ray powder diffraction (XRPD) patterns for MOF-5 synthesized in Comparative Example 16 and comparative Example 17 according to conventional methods, MOF-5 synthesized in Example 18 according to the microwave-assisted method of the invention, and with a simulated pattern obtained from literature.

Once the MOFs were formed, they were characterized using XRPD to confirm their composition. XRPD patterns were collected on a Bruker General Area Detector Diffraction System for 900 seconds with an 8.5 cm sample-to-detector distance. Solvated crystals used for XRPD measurements were transferred along with a mother liquor into a 0.7 mm capillary tube. For example, FIG. 7 plots an XRPD pattern for the MOF-5 obtained in Comparative Examples 16 and 18 along with a simulated pattern obtained from literature. It is evident from FIG. 7 that the XRPD pattern for laboratory-synthesized MOF-5 using microwave-assisted methods of the invention described in Example 18 coincided closely with the MOF-5 synthesized by conventional methods in Comparative Example 16, and with the simulated pattern, indicating that the MOF-5 in Example 18 was formed correctly.

The direct and fast crystallization of MOF precursors in response to microwave energy according to the invention provided unexpectedly fast nonlinear MOF crystal formation. The mechanism for the crystallization that occurs through the synthesis methods of the invention is not certain but conjectures on how the microwave is able to enhance the crystal growth process may be made. One theory for the rapid crystallization is that dipolar solvent molecules are superheated by the microwaves thus generating enough binding energy for crystal formation. Because of the homogenous heating effect, seeding conditions are likely created throughout the solution. Once a seed starts to grow, available reactant molecules could quickly be depleted by many adjacent seeds around, which would explain why the size of the crystals is largely dependent on the reactant concentration provided.

Understanding the mechanism for the formation of MOF crystals through MOF synthesis is not necessary to practice the invention, which is illustrated completely by the above description. The proposed mechanism is provided only because the theory of the mechanism, if correct, will provide skilled artisans with additional information that can be used to practice variations of the preferred embodiments.

As mentioned above, in another embodiment of the invention, secondary growth processes may be employed to create larger MOF particles using small MOF crystals obtained from the microwave synthesis methods described earlier. This post-processing may involve solvothermal or hydrothermal processes that reach and maintain a predetermined equilibrium temperature for a predetermined time, such as the conventional processes discussed in the background of this application.

Figure 8:
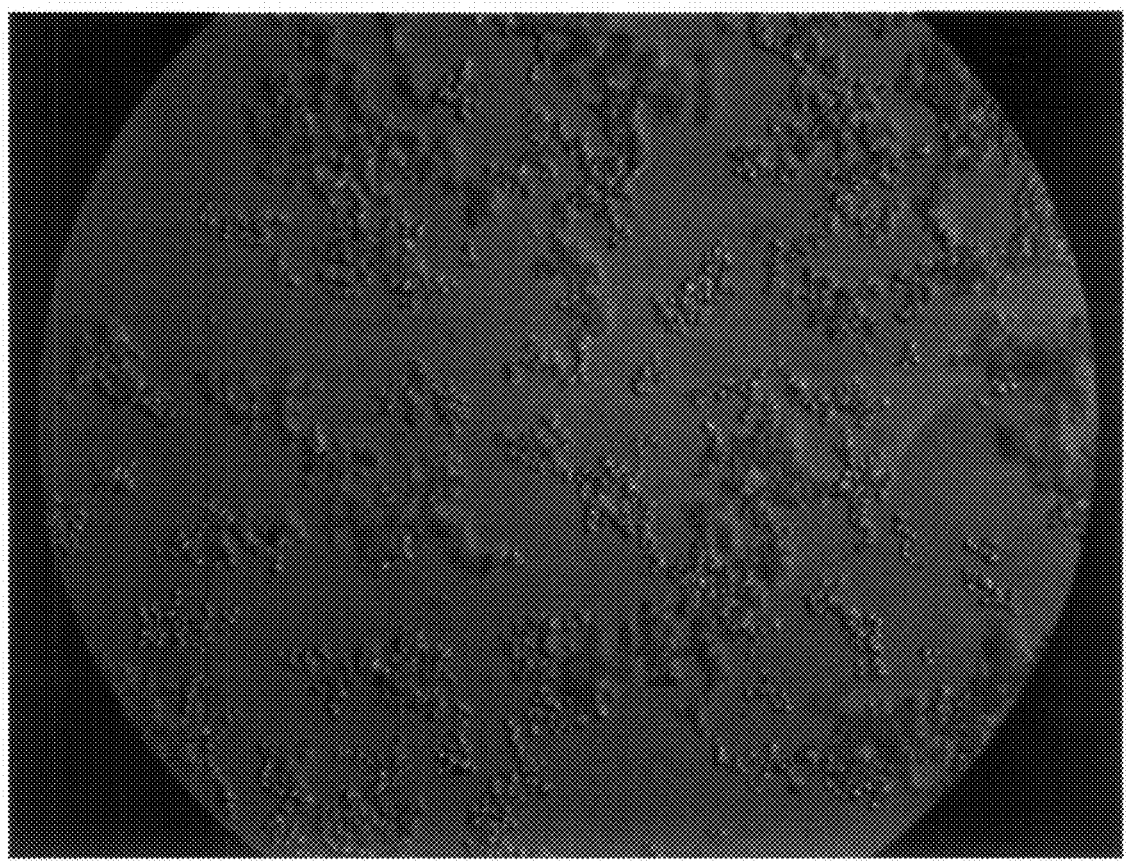
FIG. 8 is an SEM photograph of IRMOF-1 crystals formed by microwave synthesis according to principles of the invention. In this synthesis, an exact amount of $Zn(NO_3)_2 \cdot 6H_2O$ (0.2 g, 0.67 mmol) and 1,4-benzenedicarboxylate acid ($BDCH_2$) (0.083 g, 0.50 mmol) were dissolved in 10 mL of the N,N'-diethylformamide (DEF) resulting in a clear solution. The solution was then sealed in a Pyrex sample vial and heated in a household microwave oven (800 W) for a reaction time that varied from 30 sec to 1 min.
Figure 9:
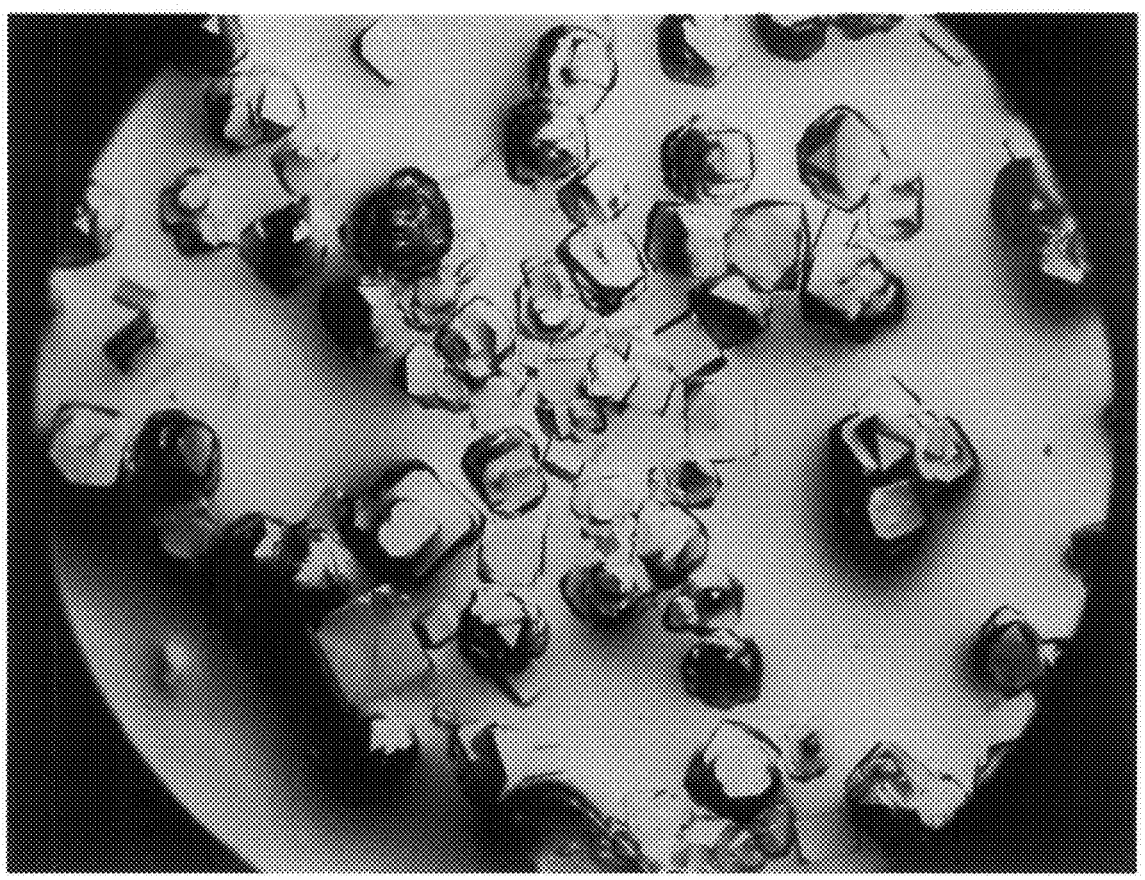
FIG. 9 is an SEM photograph of large IRMOF-1 crystals obtained after a secondary growth process according to principles of the invention. In this process, a solution including 0.200 g of $Zn(NO_3)_2 \cdot 6H_2O$ and 0.084 g of 1,4-dibenzenedicarboxylate ($H_2BDC$) ligand was dissolved in 20 mL N,N'diethylformamide (DEF) was made. The solution was stirred for 30 minutes. 1 mg of the IRMOF-1 crystals in FIG. 8 were suspended in the solution and then heated in a closed vessel at 80° C. After one day, 50-200 μm IRMOF-1 crystals were collected.

For example, in another set of experiments, secondary growth of larger IRMOF-1 crystals was accomplished using smaller IRMOF-1 crystals synthesized by microwave-assisted methods of the invention described earlier. FIG. 8 is an SEM photograph of the smaller IRMOF-1 crystals formed by microwave synthesis. An exact amount of $Zn(NO_3)_2 \cdot 6H_2O$ (0.2 g, 0.67 mmol) and 1,4-benzenedicarboxylate acid ($BDCH_2$) (0.083 g, 0.50 mmol) were dissolved in 10 mL of the N,N'-diethylformamide (DEF) resulting in a clear solution. The solution was then sealed in a Pyrex sample vial and heated in a household microwave oven (800 W) for a reaction time varied from 30 sec to 1 min. A yellow suspension formed after the microwave treatment having a size of 5±1 micron. A solution including 0.200 g of $Zn(NO_3)_2 \cdot 6H_2O$ and 0.084 g of 1,4-dibenzenedicarboxylate ($H_2BDC$) ligand was dissolved in 20 mL N,N'diethylformamide (DEF) was made. The solution was stirred for 30 minutes. 1 mg of the smaller IRMOF-1 crystals obtained previously were suspended in the solution and then heated in a closed vessel at 80° C. After one day, 50-200 µm IRMOF-1 crystals were collected, as shown in the SEM photograph of FIG. 9.

In general, due to their advantageous small size, MOFs synthesized by the microwave-assisted methods of the invention may be used in a variety of applications that utilize the rapid mass transfer that a smaller particle size allows. Such applications may include, but are not limited to selective sorption in preconcentrators and other applications, drug delivery, hydrogen storage, non-linear optical materials, templates for the creation of molecular species architectures, and as catalysts e.g., catalysts to store $H_2$ (in fuel cells) or $CO_2$, luminescence materials, ion exchange, enantioselective separator, gas purification, gas separation, gas ($H_2$, $CH_4$, $N_2$, $CO_2$ and $O_2$) storage.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. A method for synthesis of non-linear metal organic framework (MOF) material, said method comprising the steps of:
   preparing a reactant solution including MOF precursors; and
   exposing said reactant solution to a microwave dose sufficient to form crystals of non-linear MOF material in the reactant solution.

2. The method of claim 1, wherein the microwave dose in said exposing step exceeds about 4 J/cm$^3$.

3. The method of claim 1, wherein the microwave dose in said exposing step is applied for period of between about 5 seconds to about 2.5 minutes.

4. The method of claim 1, further comprising a step of post-processing growth of said crystals of the MOF material by one of a solvothermal or hydrothermal process that reaches and maintains a predetermined equilibrium temperature for a predetermined time.

5. The method of claim 1, wherein the MOF precursors include a metal precursor and a corresponding spacer ligand in a predetermined ratio, and the amount of metal precursor is set to achieve a corresponding crystal size in the metal organic framework material.

6. The method of claim 1, wherein the non-linear metal organic framework material has a cubic structure.

7. The method of claim 1, wherein said preparing step includes mixing MOF precursors in a solvent.

8. The method of claim 1, further comprising the step of removing MOF material from the reactant solution after said step of exposing.

9. The method of claim 1, wherein the MOF precursors comprise $Zn(NO_3)_2 \cdot 6H_2O$ and 4,4',4'',4'''-(21H,23H-porphine-5-10-15-20-tetrayl)tetrakis(benzoic acid), the reactant solution includes a solvent comprising diethylformamide, and the crystals comprise Zn-MOF1 crystals having a cubic crystalline structure having sizes in the range from about 10 microns to about 30 microns.

10. The method of claim 1, wherein the MOF precursors comprise $Zn(NO_3)_2 \cdot 6H_2O$ and 2-anilino-5-bromoterephthalic acid, the reactant solution includes a solvent comprising diethylformamide, and the crystals comprise Zn-MOF2 crystals having a cubic crystalline structure having sizes in the range from 2 to 4 microns.

11. The method of claim 1, wherein the MOF precursors comprise $Zn(NO_3)_2 \cdot 6H_2O$ and 2-trifluoromethoxy terephthalic acid, the reactant solution includes a solvent comprising diethylformamide, and the crystals comprise Zn-MOF3 crystals having a cubic crystalline structure having sizes in the range from 4 to 7 microns.

12. The method of claim 1, wherein the MOF precursors comprise $Zn(NO_3)_2 \cdot 6H_2O$ and nitroterephthalic acid, the reactant solution includes a solvent comprising diethylformamide, and the crystals comprise Zn-MOF4 crystals having an irregular shape.

13. The method of claim 1, wherein the MOF precursors comprise $Zn(NO_3)_2 \cdot 6H_2O$ and cis-cyclobutane-1,2-dicarboxylic acid, the reactant solution includes a solvent comprising diethylformamide, and the crystals comprise Zn-MOF5 crystals.

14. The method of claim 1, wherein the MOF precursors comprise $Cu(NO_3)_2 \cdot 2.5H_2O$ and 2,5-thiophenedicarboxylic acid, the reactant solution includes a solvent comprising diethylformamide, and the crystals comprise Cu-MOF1 crystals.

15. The method of claim 1, wherein the MOF precursors comprise $Cu(NO_3)_2 \cdot 2.5H_2O$ and 2-(trifluoromethoxy)terephthalic acid, the reactant solution includes a solvent comprising diethylformamide, and the crystals comprise Cu-MOF2 crystals.

16. The method of claim 1, wherein the MOF precursors comprise $Tb(NO_3)_3 \cdot 5H_2O$ and terephthalic acid, the reactant solution includes a solvent comprising diethylformamide, and the crystals comprise Tb-MOF1 crystals having a rod shaped crystalline structure.

17. The method of claim 1, wherein the MOF precursors comprise $Tb(NO_3)_3 \cdot 5H_2O$ and 2,5-thiophenedicarboxylic acid, the reactant solution includes a solvent comprising diethylformamide, and the crystals comprise Tb-MOF2 crystals.

18. The method of claim 1, wherein the MOF precursors comprise $Cd(NO_3)_2 \cdot 4H_2O$ and cis-cyclobutane-1,2-dicarboxylic acid, the reactant solution includes a solvent comprising diethylformamide, and the crystals comprise Cd-MOF1 crystals.

19. The method of claim 1, wherein the MOF precursors comprise $Cd(NO_3)_2 \cdot 4H_2O$ and nitroterephthalic acid, the reactant solution includes a solvent comprising diethylformamide, and the crystals comprise Cd-MOF2 crystals.

20. The method of claim 1, wherein the MOF precursors comprise $Cd(NO_3)_2 \cdot 4H_2O$ and terephthalic acid, the reactant solution includes a solvent comprising diethylformamide, and the crystals comprise Cd-MOF3 crystals.

21. The method of claim 1, wherein the MOF precursors comprise $Co(NO_3)_2 \cdot 6H_2O$ and terephthalic acid, the reactant solution includes a solvent comprising diethylformamide, and the crystals comprise Co-MOF1 crystals.

22. The method of claim 1, wherein the MOF precursors comprise $Co(NO_3)_2 \cdot 6H_2O$ and 1,3,5-benzenetricarboxylic acid, the reactant solution includes a solvent comprising diethylformamide, and the crystals comprise Co-MOF2 crystals.

23. The method of claim 1, wherein the MOF precursors comprise $Zn(NO_3)_2 \cdot 6H_2O$ and 3,3-bis(trifluoromethyl)-1-oxo-5-isobenzofurancarboxylic acid, the reactant solution includes a solvent comprising diethylformamide and water, and the crystals comprise Zn-MOF6 crystals.

24. The method of claim 11, wherein about a 4:3 molar ratio of $Zn(NO_3)_2 \cdot 6H_2O$:2-trifluoromethoxy terephthalic acid is dissolved in diethylformamide to form a 0.05 M to 0.0002 M reactant solution with respect to 2-trifluoromethoxy terephthalic acid.

25. The method of claim 24, wherein 0.504 mmol of $Zn(NO_3)_2 \cdot 6H_2O$ and 0.378 mmol of 2-trifluoromethoxy terephthalic acid are dissolved in 10 mL of diethylformamide.

* * * * *